(12) United States Patent
Sahoo et al.

(10) Patent No.: US 11,626,810 B1
(45) Date of Patent: Apr. 11, 2023

(54) MULTILEVEL POWER CONVERTERS

(71) Applicants: Ashish K. Sahoo, San Jose, CA (US); Brandon Pierquet, San Francisco, CA (US); Jie Lu, Sunnyvale, CA (US)

(72) Inventors: Ashish K. Sahoo, San Jose, CA (US); Brandon Pierquet, San Francisco, CA (US); Jie Lu, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 878 days.

(21) Appl. No.: 16/556,808

(22) Filed: Aug. 30, 2019

Related U.S. Application Data

(63) Continuation of application No. 16/284,440, filed on Feb. 25, 2019.

(60) Provisional application No. 62/637,607, filed on Mar. 2, 2018.

(51) Int. Cl.
| | |
|---|---|
| *H02M 7/483* | (2007.01) |
| *H02J 7/00* | (2006.01) |
| *H02M 7/537* | (2006.01) |
| *H02M 3/335* | (2006.01) |
| *H02M 7/219* | (2006.01) |

(52) U.S. Cl.
CPC ........... *H02M 7/483* (2013.01); *H02J 7/0068* (2013.01); *H02M 3/33592* (2013.01); *H02M 7/219* (2013.01); *H02M 7/537* (2013.01)

(58) Field of Classification Search
CPC .... H02M 7/483; H02M 7/219; H02M 1/0095; H02M 3/33569; H02M 3/33592
See application file for complete search history.

(56) References Cited

U.S. PATENT DOCUMENTS

| | | | |
|---|---|---|---|
| 6,256,214 B1 | 7/2001 | Farrington et al. | |
| 9,450,506 B2 | 9/2016 | Perreault et al. | |
| 10,862,398 B2 | 12/2020 | Phadke | |
| 2014/0003095 A1* | 1/2014 | Thomas | H02M 3/33584 363/21.04 |
| 2014/0153290 A1* | 6/2014 | Li | H02M 3/33573 363/17 |
| 2016/0241152 A1 | 8/2016 | Wakabayashi et al. | |
| 2016/0248336 A1 | 8/2016 | Kamata et al. | |
| 2018/0048240 A1* | 2/2018 | Hayasaki | H02M 3/33507 |
| 2018/0198373 A1* | 7/2018 | Torrico-Bascopé | H02M 3/33592 |
| 2019/0052177 A1* | 2/2019 | Lu | H02M 7/797 |
| 2020/0076317 A1* | 3/2020 | Yao | H02M 3/33584 |
| 2020/0186043 A1 | 6/2020 | Park et al. | |

OTHER PUBLICATIONS

Vincotech, "MiniSkiiP Power Modules for Standard Drives", http://dtsheet.com/doc/1379601/miniskiip%C2%AE-power-modules-for-standard-drives. Downloaded Jan. 31, 2018 (6 pp).

(Continued)

*Primary Examiner* — Alex Torres-Rivera
(74) *Attorney, Agent, or Firm* — Young Basile Hanlon & MacFarlane, P.C.

(57) ABSTRACT

Systems and methods for power conversion are described. For example, a system may include a transformer including a plurality of secondary windings; a first set of switches connecting respective taps of the plurality of secondary windings to a first terminal; a second set of switches connecting the respective taps of the plurality of secondary windings to a second terminal; and an electrical load connected between the first terminal and the second terminal.

25 Claims, 16 Drawing Sheets

(56) References Cited

OTHER PUBLICATIONS

Lin, Bor-Ren, "Hybrid DC/DC converter based on dual three-level circuit and half-bridge circuit", https://www.researchgate.net/publication/287806932_Hybrid_DCDC_converter_based_on_dual_three-level_circuit_and_half-bridge_circuit, Dec. 2016 (Downloaded Nov. 27, 2017), 2 pp.

Ruan, X., et al., "Fundamental Considerations of Three-Level DC-DC Converters: Topologies, Analyses, and Control", IEEE Transactions on Circuits and Systems—I: Regular Papers, vol. 55, No. 11, Dec. 2008 (11 pp).

Suresh, Y., et al., "Investigation on cascade multilevel inverter with symmetric, asymmetric, hybrid and multi-cell configurations", Ain Shams Engineering Journal (2017) 8, 263-276, Available online Oct. 27, 2016 (14 pp).

Vincotech, "Vincotech Power Modules Catalog 2011/12", Downloaded Feb. 8, 2019 from https://www.arrow.com, (48 pp).

Abramson, Rose A., et al., "Design and Evaluation of a Reconfigurable Stacked Active Bridge dc/dc Converter for Efficient Wide Load-Range Operation", IEEE, Jul. 2017, 978-1-5090-5366 (11 pp).

Bodor, M., et al., "Soft Switching DC-DC Converter with Controlled Output Rectifier", 10th Scientific Conference of Young Researchers—Fei Tu of Kosice, 2010, (4 pp).

Guo, Z., et al., "Hybrid Three-Level and Half-Bridge DC-DC Converter With Reduced Circulating Loss and Output Filter Inductance", IEEE Transactions on Power Electronics (vol. 30, Issue 12, Dec. 2015), Downloaded Nov. 27, 2017, https://ieeexplore.ieee.org/document/7017562, (4 pp).

Corzine, Keith, et al., "Analysis of a Four-Level DC/DC Buck Converter", IEEE Transactions on Industrial Electronics, Institute of Electrical and Electronics Engineers, Jan. 2002 (7 pp).

\* cited by examiner

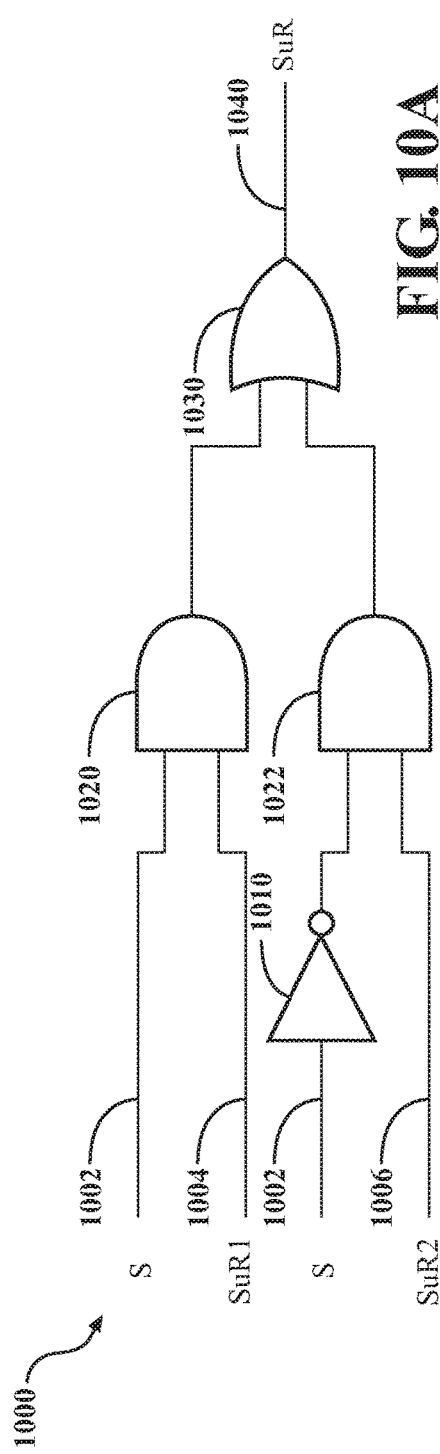
FIG. 10A
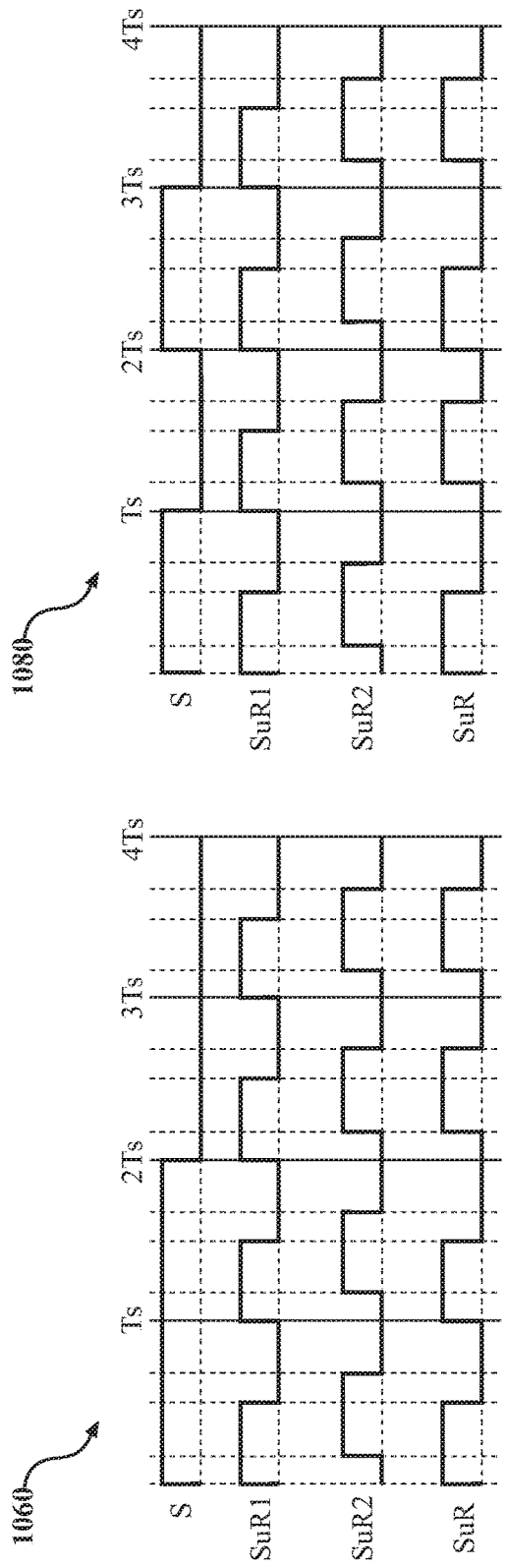
FIG. 10B
FIG. 10C

MULTILEVEL POWER CONVERTERS

CROSS-REFERENCE TO RELATED APPLICATIONS

This application is a continuation of U.S. patent application Ser. No. 16/284,440, which was filed on Feb. 25, 2019, which claims the benefit of U.S. Provisional Application No. 62/637,607, filed on Mar. 2, 2018, entitled "Multilevel Power Converters," the contents of which are incorporated herein by reference in their entirety for all purposes.

TECHNICAL FIELD

This disclosure relates to multilevel power converters.

BACKGROUND

Multilevel power converters are used to transfer power between circuits operating at different voltage levels. For example, multilevel power converters may be employed at terminals of high voltage power transmission lines. For example, multilevel power converters may be employed in power supplies for computing server racks.

SUMMARY

Disclosed herein are implementations of multilevel power converters.

In a first aspect, the subject matter described in this specification can be embodied in systems that include a transformer including a first secondary winding, connecting a first tap and a second tap, and a second secondary winding, connecting a third tap and the second tap; a first switch connecting the first tap to a first terminal; a second switch connecting the first tap to a second terminal; a third switch connecting the second tap to the first terminal; a fourth switch connecting the second tap to the second terminal; a fifth switch connecting the third tap to the first terminal; a sixth switch connecting the third tap to the second terminal; and an electrical load connected between the first terminal and the second terminal.

In a second aspect, the subject matter described in this specification can be embodied in systems that include a transformer including a primary winding, connecting a first tap and a second tap; a first capacitor connecting a first terminal to the second tap; a second capacitor connecting the second tap to a second terminal; a first switch connecting the first terminal to a first node; an second switch connecting the first node to the second tap; a third switch connecting the second tap to a second node; a fourth switch connecting the second node to the second terminal; an fifth switch connecting the first node to the first tap; and a sixth switch connecting the second node to the first tap.

In a third aspect, the subject matter described in this specification can be embodied in methods for controlling switches in a multilevel synchronous rectifier that include, in a first state corresponding to a first voltage level, opening a first set of switches and closing a second set of switches; and, in a second state corresponding to the first voltage level, closing the first set of switches and opening the second set of switches, wherein the switches in the first set of switches are paired with respective switches in the second set of switches to prevent shorting terminals of the multilevel synchronous rectifier.

In a fourth aspect, the subject matter described in this specification can be embodied in systems that include a transformer including a plurality of secondary windings; a first set of switches connecting respective taps of the plurality of secondary windings to a first terminal; a second set of switches connecting the respective taps of the plurality of secondary windings to a second terminal; and an electrical load connected between the first terminal and the second terminal.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 10A is a diagram of an example of logic used to generate a signal for controlling a switch of an inverter with phase changes.

FIG. 10B is a plot of an example of signals of the switching phase control logic of FIG. 10A.

FIG. 10C is a plot of an example of signals of the switching phase control logic of FIG. 10A.

DETAILED DESCRIPTION

Described herein are systems, circuits, and methods that may be used to implement multilevel power converters. Efficiency, size, weight, power density, and reliability can be important design considerations in power converters. Power converter circuit topologies and modulation schemes, for inverters and rectifiers, are described that may increase efficiency, reduce size and weight, increase power density, and/or increase reliability compared to conventional topologies and modulation schemes. For example, these power converters may be implemented in power distribution networks, photovoltaic systems, wind turbines, electric vehicles, or computing server racks.

In switched multilevel converters, multiple modulation states may be used for a given transformer voltage level. The multiple states for a voltage level may utilize (e.g., conduct current through) different components (e.g., switches), and alternating between the multiple states during operation of the converter may serve to balance the usage of these components. Balancing the usage of components may reduce thermal stress on components and increase reliability of a power converter. In some implementations, the multiple states may also be used to balance the charges on stacked capacitors, which may enable the use of capacitors with lower voltage ratings. Capacitors with lower voltage ratings may be smaller and/or less costly. Using smaller capacitors may decrease the size and/or weight of the converter, which may increase the power density achieved. Circuit topologies and modulation schemes for efficiently implementing this strategy are described below.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Figure 1A:
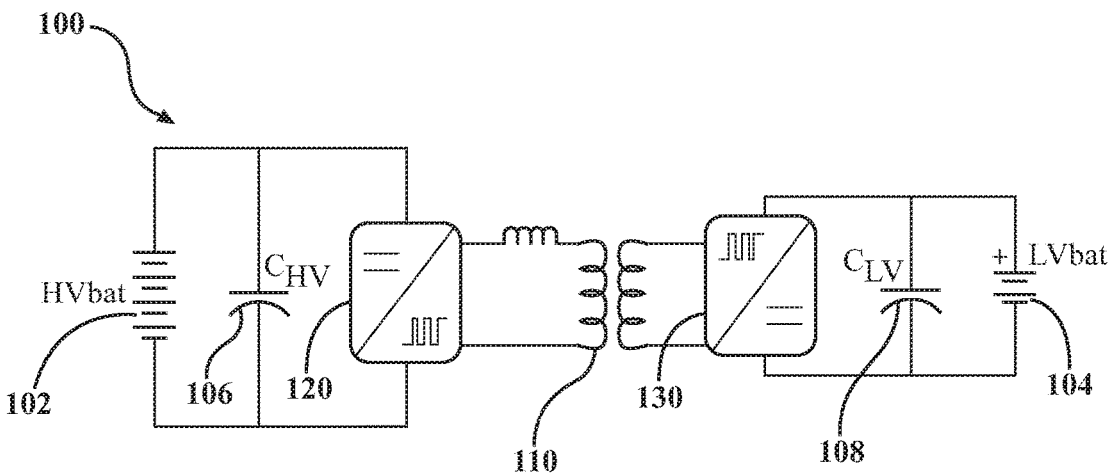
FIG. 1A is a circuit diagram of an example of a system including a high voltage to low voltage DC/DC converter.

FIG. 1A is a circuit diagram of an example of a system 100 including a high voltage to low voltage DC/DC converter. The system 100 couples power from a high voltage battery 102 (e.g., a 400 Volt or an 800 volt battery) to a low voltage battery 104 (e.g., a 12 volt or a 48 volt battery). A capacitor 106 is in parallel with the high voltage battery 102 and a capacitor 108 is in parallel with the low voltage battery 104. The system 100 includes a transformer 110 that couples power from an inverter 120 to a rectifier 130. For example, transformer 110 may be implemented using the transformer 300 of FIG. 3A. For example, transformer 110 may be implemented using the transformer 350 of FIG. 3B. The high voltage battery 102 is connected to terminals of the inverter 120 and the low voltage battery 104 is connected to terminals of the rectifier 130.

For example, a computing server rack may use the system 100 to couple bulk power at a low DC voltage (e.g., from a battery back-up system) to individual equipment items. For example, electric vehicles may use the system 100 to couple power from a high voltage battery 102, which provides power to a propulsion system to move the vehicle, to a low voltage 104, which provides power to one or more auxiliary systems of the electric vehicle. For example, the propulsion system may include a DC motor, a drive train, and/or a transmission system configured to convert electrical power to mechanical power and transfer the mechanical power to torque on wheels of the vehicle. Some applications utilize a high battery voltage (e.g., a 400 volt battery or an 800 volt battery) and different low voltage battery voltages (e.g., 12V and 48V) and may also support very wide input range and output range. On the low voltage side, to increase the power rating of the converter, many devices may be connected in parallel, which may restrict the practical power output of the converter.

The rectifier 130 may be suitable to be interfaced with the low voltage battery 104 and be able to provide high efficiency while meeting desired specifications. For example, rectifier 130 may be implemented using the topology of the system 200 of FIG. 2. Switching control may be formulated for operation of a topology of the inverter 120 and the rectifier 130 to attain zero voltage switching over an entire battery range. For example, the processing apparatus 1510 of the system 1500 of FIG. 15 may be used to implement switching control for the system 100. Zero voltage switching enables use of switching frequency in the MHz range and may reduce the size of magnetic components. This may result in obtaining high power density which converts to savings in volume and weight of the system 100.

For high voltage batteries (e.g., an 800 volt battery), newer multilevel topologies may be used to exploit the benefits of latest wide band-gap GaN technology (e.g., available to 650 volts). The inverter 120 may be suitable to be interfaced with the high voltage battery 102 and be able to provide high efficiency while meeting desired specifications. In some implementations, switching control may be formulated to achieve active voltage balancing of split capacitors in the inverter 120. For example, the inverter 120 may include a three-level stacked half-bridge topology. For example, inverter 120 may be implemented using the topology of the system 700 of FIG. 7. For example, inverter 120 may be implemented using the topology of the system 1100 of FIG. 11. For example, inverter 120 may be implemented using the topology of the system 1300 of FIG. 13. The topology of the inverter 120 may achieve higher efficiency than conventional half-bridge topologies.

The converters of the system 100 may be bidirectional in the sense that power may be transferred from the high voltage battery 102 to the low voltage battery 104 and/or from the low voltage battery 104 to the high voltage battery 102.

Figure 1B:
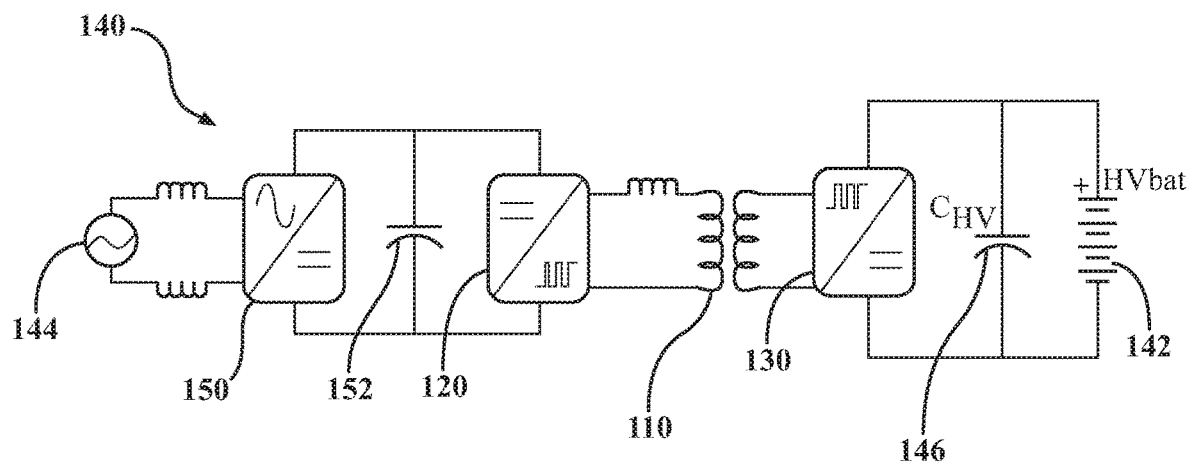
FIG. 1B is a circuit diagram of an example of a system including a multi-stage, high voltage charger.
Figure 1C:
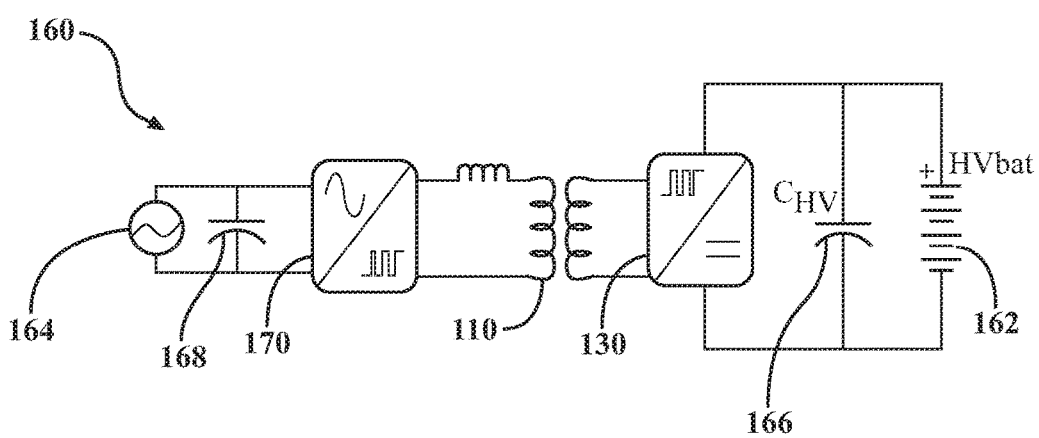
FIG. 1C is a circuit diagram of an example of a system including a single-stage, high voltage charger.

The inverter 120 and/or the rectifier 130 topologies can be employed in other systems for different applications, such as the system 140 of FIG. 1B and the system 160 of FIG. 1C. The inverter 120 and the rectifier 130 may be bidirectional, and hence can be used in applications of high voltage to low voltage DC/DC converters, and high voltage chargers.

FIG. 1B is a circuit diagram of an example of a system 140 including a multi-stage, high voltage charger. The system 140 includes a high voltage battery 142 that is charged from an alternating current (AC) power source 144 (e.g., from a grid). A capacitor 146 is in parallel with the high voltage battery 142. Power from the AC power source 144 is converted to DC voltage using the rectifier 150. Power from the resulting DC voltage across a capacitor 152 may then be the further converted to a DC voltage level used to charge the high voltage battery 142 by a DC/DC converter including the inverter 120, the transformer 110, and the rectifier 130.

FIG. 1C is a circuit diagram of an example of a system 160 including a single-stage, high voltage charger. The system 160 includes a high voltage battery 162 that is charged from an alternating current (AC) power source 164 (e.g., from a grid). A capacitor 166 is in parallel with the high voltage battery 142 and a capacitor 168 is in parallel with the AC power source 164. Power from the AC power source 144 is converted to a DC voltage level used to charge the high voltage battery 162 by an AC/DC converter including an AC/AC converter 170 that couples a high frequency multilevel signal through the transformer 110 to the rectifier 130.

Figure 2:
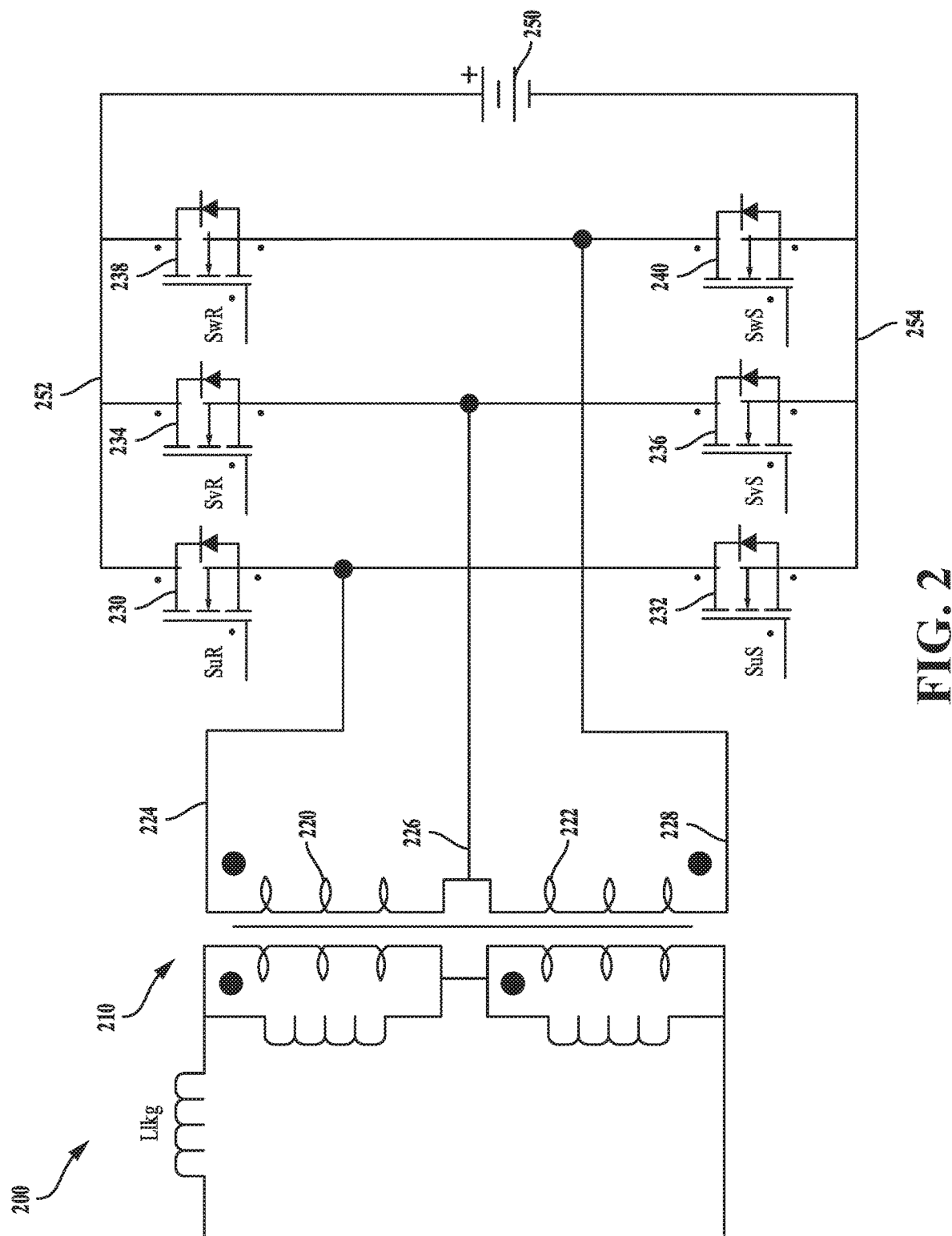
FIG. 2 is circuit diagram of an example of a system including a three-leg multilevel rectifier.

FIG. 2 is circuit diagram of an example of a system 200 including a three-leg multilevel rectifier. The system 200 includes a transformer 210 including a plurality of secondary windings (220 and 222). The system 200 includes a first set of switches (230, 234, and 238) connecting respective taps (224, 226, and 228) of the plurality of secondary windings (220 and 222) to a first terminal 252. The system 200 includes a second set of switches (232, 236, and 240) connecting the respective taps (224, 226, and 228) of the plurality of secondary windings (220 and 222) to a second terminal 254. The system 200 includes an electrical load 250 connected between the first terminal 252 and the second terminal 254. The electrical load 250 may include a battery (e.g., a 12 Volt, a 48 volt, a 400 volt, or an 800 volt battery). In some implementations (not shown), the system 200 may include a capacitor in parallel with the electrical load 250. For example, the system 200 may be implemented as part of the system 100 of FIG. 1A. For example, the system 200 may be implemented as part of the system 140 of FIG. 1B. For example, the system 200 may be implemented as part of the system 160 of FIG. 1C.

The system 200 includes a transformer 210 including a first secondary winding 220, connecting a first tap 224 and a second tap 226, and a second secondary winding 222, connecting a third tap 228 and the second tap 226. For example, the transformer 210 may be the transformer 300 of FIG. 3A. In some implementations (not shown), the transformer 210 may be replaced with the transformer 350 of FIG. 3B. In some implementations (not shown), a transformer winding may be swapped out to extend zero voltage switching in a wide input and/or output voltage range.

The system 200 includes an electrical load 250 connected between the first terminal 252 and the second terminal 254. For example, the electrical load 250 may include a battery (e.g., a 12 volt battery or a 48 volt battery).

The system 200 includes a first switch 230 connecting the first tap 224 to the first terminal 252 and a second switch 232 connecting the first tap 224 to the second terminal 254. For example, the first switch 230 may be a field effect transistor (e.g., an n channel metal oxide semiconductor field effect transistor) or another type of electronic switch. For example, the second switch 232 may be a field effect transistor (e.g., an n channel metal oxide semiconductor field effect transistor) or another type of electronic switch. In some implementations, the control signals (e.g., gate voltages) applied to the first switch 230 and the second switch 232 are configured such that the first switch 230 and the second switch 232 are not closed and conducting simultaneously to avoid shorting the electrical load 250 that is connected between the first terminal 252 and the second terminal 254. The first switch 230 and the second switch 232 may constitute a first leg of a multi-leg rectifier, which in this example of FIG. 2 is a three-leg rectifier.

The system 200 includes a third switch 234 connecting the second tap 226 to the first terminal 252 and a fourth switch 236 connecting the second tap 226 to the second terminal 254. For example, the third switch 234 may be a field effect transistor (e.g., an n channel metal oxide semiconductor field effect transistor) or another type of electronic switch. For example, the fourth switch 236 may be a field effect transistor (e.g., an n channel metal oxide semiconductor field effect transistor) or another type of electronic switch. In some implementations, the control signals (e.g., gate voltages) applied to the third switch 234 and the fourth switch 236 are configured such that the third switch 234 and the fourth switch 236 are not closed and conducting simultaneously to avoid shorting the electrical load 250 that is connected between the first terminal 252 and the second terminal 254. The third switch 234 and the fourth switch 236 may constitute a second leg of a multi-leg rectifier, which in this example of FIG. 2 is a three-leg rectifier.

The system 200 includes a fifth switch 238 connecting the third tap 228 to the first terminal 252 and a sixth switch 240 connecting the third tap 228 to the second terminal 254. For example, the fifth switch 238 may be a field effect transistor (e.g., an n channel metal oxide semiconductor field effect transistor) or another type of electronic switch. For example, the sixth switch 240 may be a field effect transistor (e.g., an n channel metal oxide semiconductor field effect transistor) or another type of electronic switch. In some implementations, the control signals (e.g., gate voltages) applied to the fifth switch 238 and the sixth switch 240 are configured such that the fifth switch 238 and the sixth switch 240 are not closed and conducting simultaneously to avoid shorting the electrical load 250 that is connected between the first terminal 252 and the second terminal 254. The fifth switch 238 and the sixth switch 240 may constitute a third leg of a multi-leg rectifier, which in this example of FIG. 2 is a three-leg rectifier.

The system 200 utilizes two less switches for rectification than a conventional dual full-bridge converter. This reduction in the number of switches and corresponding gate drive circuits and gate power supplies may provide advantages, such as increased power density, lower fabrication costs, and/or reduced size and weight.

Control signals (e.g., gate voltages) for the switches (230, 232, 234, 236, 238, and 240) of the system 200 may be generated using a modulation scheme for synchronous rectification of an AC voltage signal transferring power through the transformer 210. Multilevel voltage generation (e.g., three-level or five-level) may be used for the AC voltage signal on the transformer 210. Using a multilevel voltage signal on the transformer 210 may offer advantages, such as lowering the time derivative if the voltage across the transformer 210, which may reduce core losses in the transformer 210. Using a multilevel voltage signal on the transformer 210 may cause the current through the windings of the transformer 210 to more closely approximate sinusoidal currents, which may reduce copper losses. Using a multilevel voltage signal on the transformer 210 may enable greater control flexibility to cover wider input and/or output voltage fluctuations. For example, the modulation scheme 400 of FIG. 4 may be implemented to control the switches (230, 232, 234, 236, 238, and 240). For example, the modulation scheme 500 of FIG. 5 may be implemented to control the switches (230, 232, 234, 236, 238, and 240). For example, the modulation scheme 600 of FIG. 6 may be implemented to control the switches (230, 232, 234, 236, 238, and 240).

Figure 3A:
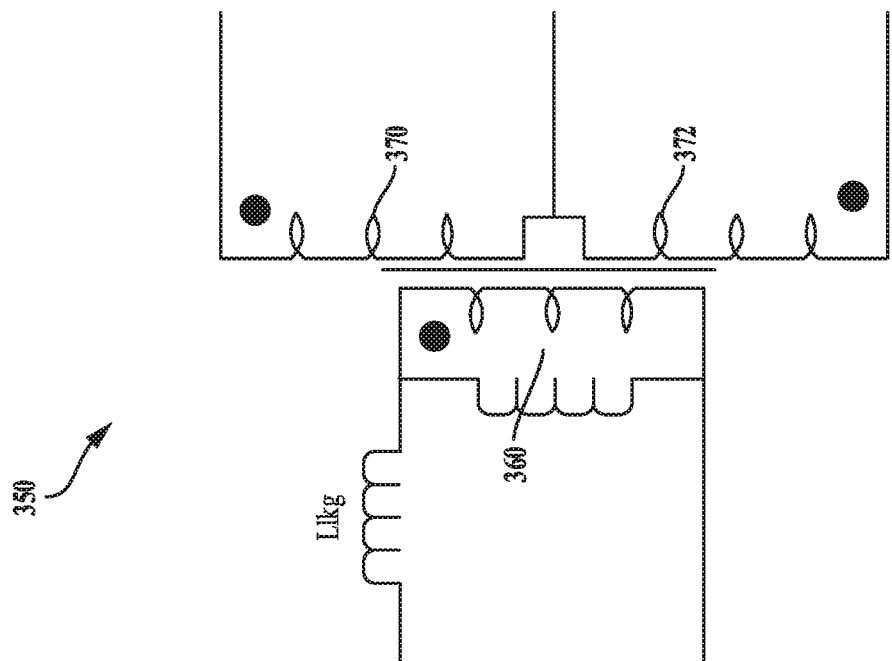
FIG. 3A is a circuit diagram of an example of a transformer.
Figure 3B:
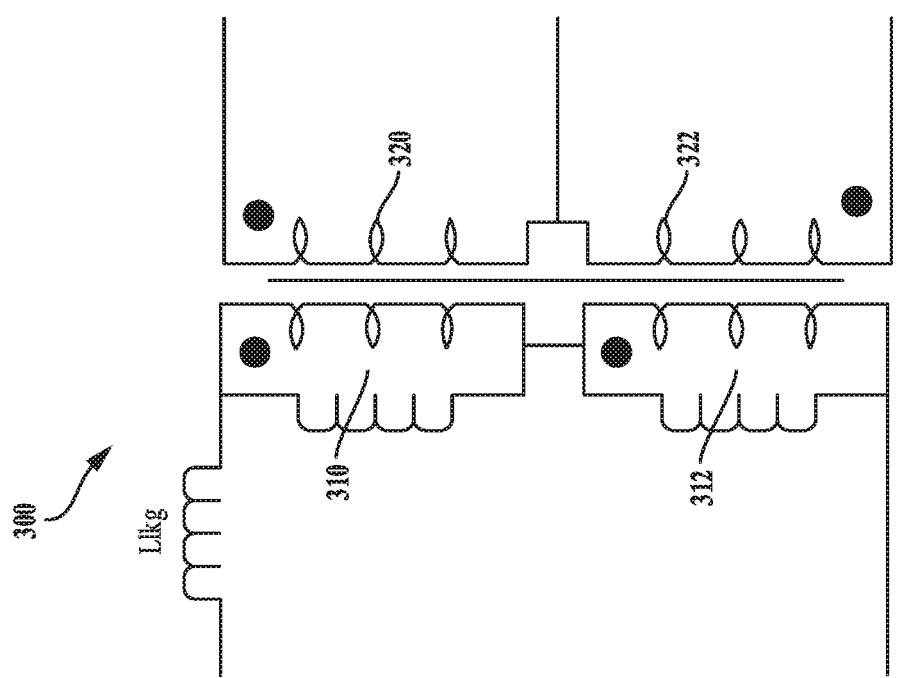
FIG. 3B is a circuit diagram of an example of a transformer.

FIGS. 3A and 3B show two examples of transformers that can be used in power converter systems described herein. FIG. 3A is a circuit diagram of an example of a transformer 300. The transformer 300 includes a first primary winding 310 and second primary winding 312 that are connected in series between two taps of the transformer 300. The transformer 300 includes a first secondary winding 320 and second secondary winding 322 that are magnetically coupled respectively to the first primary winding 310 and the second primary winding 312.

FIG. 3B is a circuit diagram of an example of a transformer 350. The transformer 350 includes a primary winding 360 that is magnetically coupled to both a first secondary winding 370 and second secondary winding 372. There may be design trade-offs between using the transformer 300 versus the transformer 350 in a power converter system (e.g., the system 100 of FIG. 1A). For example, the transformer 300 may be easier and less expensive to manufacture than the transformer 350. For example, the transformer 350 may be smaller than transformer 300 and may enable greater power density in a power converter.

Figure 4:
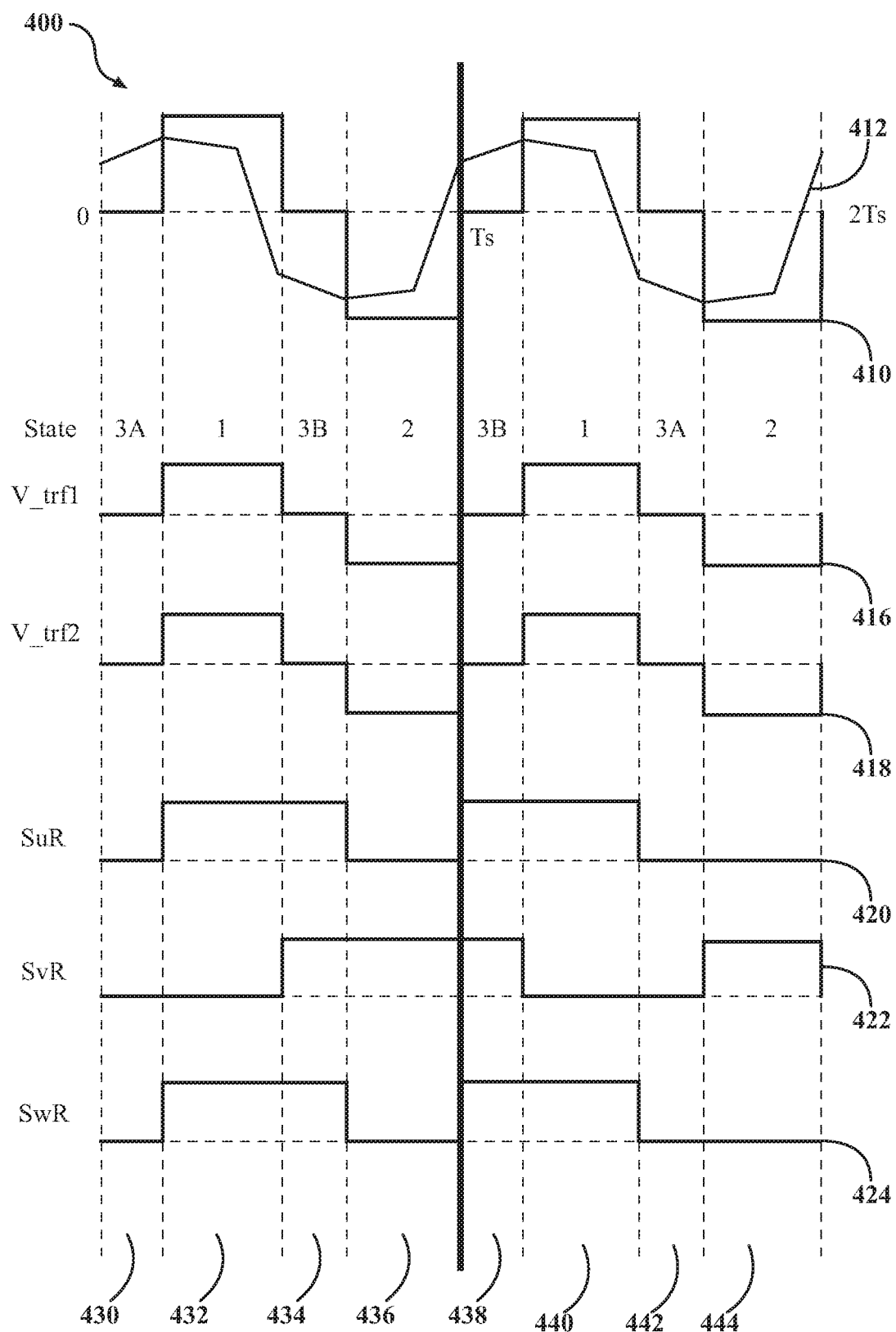
FIG. 4 is a plot of an example of a modulation scheme for switches of a three-level rectifier with corresponding transformer voltage and current signals.

FIG. 4 is a plot of an example of a modulation scheme 400 for switches of a three-level rectifier with corresponding transformer voltage and current signals. The modulation scheme 400 may be used to control the switches (230, 232, 234, 236, 238, and 240) of the system 200 to rectify voltage on the transformer 210. The plot of the modulation scheme 400 includes a plot of a voltage signal 410 across a primary winding of the transformer 210; a plot of a current signal 412 through a primary winding of the transformer 210; a plot of the voltage 416 across the first secondary winding 220; a plot of the voltage 418 across the second secondary winding 222; a plot of SuR 420, which is a control signal (e.g., a gate voltage) that controls the switch 230 and the complement of which controls the switch 232; a plot of SvR 422, which is a control signal (e.g., a gate voltage) that controls the switch 234 and the complement of which controls the switch 236; and a plot of SwR 424, which is a control signal (e.g., a gate voltage) that controls the switch 238 and the complement of which controls the switch 240. The plot is divided horizontally into time intervals (430-444) corresponding to modulation states of the modulation scheme 400. The modulation scheme 400 may be implemented by a system including a processing apparatus (e.g., the system 1500, including the processing apparatus 1510, of FIG. 15) and the system 200. The processing apparatus may be configured to control the first switch 230, the second switch 232, the third switch 234, the fourth switch 236, the fifth switch 238, and the sixth switch 238 to rectify the multilevel voltage signal 410 on the transformer. For example, the voltage signal 410 and the current signal 412 may be generated based in part on control of synchronous switching in an inverter (e.g., the inverter 120 or the inverter 1542) connected to taps of the primary winding of the transformer 210.

The plot of the modulation scheme 400 covers two periods (t=0 to t=T_s and t=T_s to t=2*T_s) of the voltage signal 410 on the transformer. During the time interval 430 (starting at time t=0) the modulation scheme 400 is in a state labeled "3A" where the voltage signal 410 is zero and the control signals SuR 420, SvR 422, and SwR 424 are all low, corresponding to switch 230, switch 234, and switch 238 being in an open (e.g., non-conducting) state and to switch 232, switch 236, and switch 240 being in a closed (e.g., conducting) state. During the time interval 432 the state of the modulation scheme 400 is labeled "1" where the voltage signal 410 is positive and the control signals SuR 420 and SwR 424 are high and the control signal SvR 422 is low, corresponding to switch 232, switch 234, and switch 240 being in an open state and to switch 230, switch 236, and switch 238 being in a closed state. During the time interval 434 the state of the modulation scheme 400 is labeled "3B" where the voltage signal 410 is zero and the control signals SuR 420, SvR 422, and SwR 424 are all high, corresponding to switch 232, switch 236, and switch 240 being in an open state and to switch 230, switch 234, and switch 238 being in a closed state. During the time interval 436 the state of the modulation scheme 400 is labeled "2" where the voltage signal 410 is negative and the control signals SuR 420 and SwR 424 are low and the control signal SvR 422 is high, corresponding to switch 230, switch 236, and switch 238 being in an open state and to switch 232, switch 234, and switch 240 being in a closed state. During the time interval 438 the state of the modulation scheme 400 is labeled "3B" where the voltage signal 410 is zero and the control signals SuR 420, SvR 422, and SwR 424 are all high, corresponding to switch 232, switch 236, and switch 240 being in an open state and to switch 230, switch 234, and switch 238 being in a closed state. During the time interval 440 the state of the modulation scheme 400 is labeled "1" where the voltage signal 410 is positive and the control signals SuR 420 and SwR 424 are high and the control signal SvR 422 is low, corresponding to switch 232, switch 234, and switch 240 being in an open state and to switch 230, switch 236, and switch 238 being in a closed state. During the time interval 442 the modulation scheme 400 is in the state labeled "3A" where the voltage signal 410 is zero and the control signals SuR 420, SvR 422, and SwR 424 are all low, corresponding to switch 230, switch 234, and switch 238 being in an open state and to switch 232, switch 236, and switch 240 being in a closed state. During the time interval 444 the state of the modulation scheme 400 is labeled "2" where the voltage signal 410 is negative and the control signals SuR 420 and SwR 424 are low and the control signal SvR 422 is high, corresponding to switch 230, switch 236, and switch 238 being in an open state and to switch 232, switch 234, and switch 240 being in a closed state.

The modulation state labeled "3A" (e.g., as used in time interval 430 and time interval 442) and the modulation state labeled "3B" (e.g., as used in time interval 434 and time interval 438) both correspond to the same voltage level (in this example a voltage of zero), but they activate different switches in the system 200. Multiple modulation states for a given voltage level may be used to balance utilization of the components of the system 200 to reduce thermal stress on those components. For example, using a modulation scheme with multiple states for given voltage levels to balance component utilization may increase reliability and useful life of the system 200. For example, the modulation 400 scheme may include, in a first state (e.g., the state "3A") corresponding to a first voltage level (e.g., zero), opening the first switch 230, the third switch 234, and the fifth switch 238 and closing the second switch 232, the fourth switch 236, and the sixth switch 240; and in a second state (e.g., the state "3B") corresponding to the first voltage level, closing the first switch 230, the third switch 234, and the fifth switch 238 and opening the second switch 232, the fourth switch 236, and the sixth switch 240. A processing apparatus may be configured to invoke both the first state (e.g., the state "3A" as shown in the time interval 430) and the second state (e.g., the state "3B" as shown in the time interval 434) during a single period (e.g., the period between t=0 and t=T_s) of a multilevel voltage signal (e.g., the voltage signal 410) on the transformer. A processing apparatus (e.g., the processing apparatus 1510) may be configured to change a phase of the first state (e.g., the state "3A") and the second state (e.g., the state "3B") between periods of the multilevel voltage signal (e.g., the voltage signal 410) on the transformer 210. For example, in a first period between t=0 and t=T_s, the state "3A" of the modulation scheme 400 occurs in the time interval 430, before the state "3B" occurs during the time interval 434. During the next period between t=T_s and t=2*T_s, the phase of these states is changed such that the state "3A" of the modulation scheme 400 occurs in the time interval 442, after the state "3B" occurs during the time interval 438.

Figure 5:
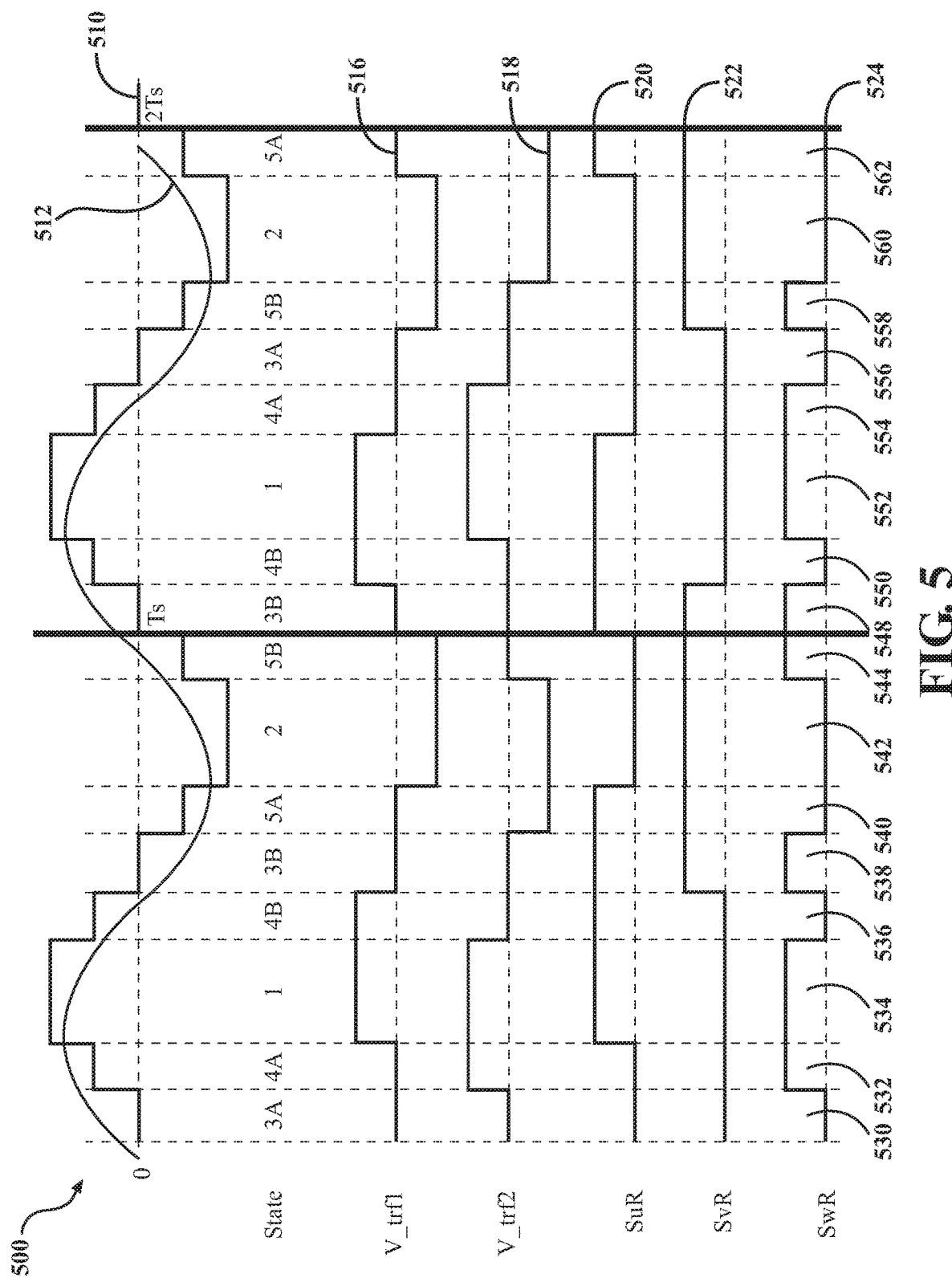
FIG. 5 is a plot of an example of a modulation scheme for switches of a five-level rectifier with corresponding transformer voltage and current signals.

FIG. 5 is a plot of an example of a modulation scheme 500 for switches of a five-level rectifier with corresponding transformer voltage and current signals. The modulation scheme 500 may be used to control the switches (230, 232, 234, 236, 238, and 240) of the system 200 to rectify voltage on the transformer 210. The plot of the modulation scheme 500 includes a plot of a voltage signal 510 across a primary winding of the transformer 210; a plot of a current signal 512 through a primary winding of the transformer 210; a plot of the voltage 516 across the first secondary winding 220; a plot of the voltage 518 across the second secondary winding 222; a plot of SuR 520, which is a control signal (e.g., a gate voltage) that controls the switch 230 and the complement of which controls the switch 232; a plot of SvR 522, which is a control signal (e.g., a gate voltage) that controls the switch 234 and the complement of which controls the switch 236; and a plot of SwR 524, which is a control signal (e.g., a gate voltage) that controls the switch 238 and the complement of which controls the switch 240. The plot is divided horizontally into time intervals (530-562) corresponding to modulation states of the modulation scheme 500. The modulation scheme 500 may be implemented by a system including a processing apparatus (e.g., the system 1500, including the processing apparatus 1510, of FIG. 15) and the system 200. The processing apparatus may be configured to control the first switch 230, the second switch 232, the third switch 234, the fourth switch 236, the fifth switch 238, and the sixth switch 238 to rectify the multilevel voltage signal 510 on the transformer. For example, the voltage signal 510 and the current signal 512 may be generated based in part on control of synchronous switching in an inverter (e.g., the inverter 120 or the inverter 1542) connected to taps of the primary winding of the transformer 210.

The plot of the modulation scheme 500 covers two periods (t=0 to t=T_s and t=T_s to t=2*T_s) of the voltage signal 510 on the transformer. During the time interval 530 (starting at time t=0) the modulation scheme 500 is in a state labeled "3A" where the voltage signal 510 is zero and the control signals SuR 520, SvR 522, and SwR 524 are all low, corresponding to switch 230, switch 234, and switch 238 being in an open (e.g., non-conducting) state and to switch 232, switch 236, and switch 240 being in a closed (e.g., conducting) state. During the time interval 532 the state of the modulation scheme 500 is labeled "4A" where the voltage signal 510 is an intermediate positive value and the control signals SuR 520 and SvR 522 are low and the control signal SwR 524 is high, corresponding to switch 230, switch 234, and switch 240 being in an open state and to switch 232, switch 236, and switch 238 being in a closed state. During the time interval 534 the state of the modulation scheme 500 is labeled "1" where the voltage signal 510 is peak positive value and the control signals SuR 520 and SwR 524 are high and the control signal SvR 522 is low, corresponding to switch 232, switch 234, and switch 240 being in an open state and to switch 230, switch 236, and switch 238 being in a closed state. During the time interval 536 the state of the modulation scheme 500 is labeled "4B" where the voltage signal 510 is the intermediate positive value and the control signals SvR 522 and SwR 524 are low and the control signal SuR 520 is high, corresponding to switch 232, switch 234, and switch 238 being in an open state and to switch 230, switch 236, and switch 240 being in a closed state. During the time interval 538 the state of the modulation scheme 500 is labeled "3B" where the voltage signal 510 is zero and the control signals SuR 520, SvR 522, and SwR 524 are all high, corresponding to switch 232, switch 236, and switch 240 being in an open state and to switch 230, switch 234, and switch 238 being in a closed state. During the time interval 540 the state of the modulation scheme 500 is labeled "5A" where the voltage signal 510 is an intermediate negative value and the control signals SuR 520 and SvR 522 are high and the control signal SwR 524 is low, corresponding to switch 232, switch 236, and switch 238 being in an open state and to switch 230, switch 234, and switch 240 being in a closed state. During the time interval 542 the state of the modulation scheme 500 is labeled "2" where the voltage signal 510 is a peak negative value and the control signals SuR 520 and SwR 524 are low and the control signal SvR 522 is high, corresponding to switch 230, switch 236, and switch 238 being in an open state and to switch 232, switch 234, and switch 240 being in a closed state. During the time interval 544 the state of the modulation scheme 500 is labeled "5B" where the voltage signal 510 is the intermediate negative value and the control signals SvR 522 and SwR 524 are high and the control signal SuR 520 is low, corresponding to switch 230, switch 236, and switch 240 being in an open state and to switch 232, switch 234, and switch 238 being in a closed state. During the time interval 548 the state of the modulation scheme 500 is labeled "3B" where the voltage signal 510 is zero and the control signals SuR 520, SvR 522, and SwR 524 are all high, corresponding to switch 232, switch 236, and switch 240 being in an open state and to switch 230, switch 234, and switch 238 being in a closed state. During the time interval 550 the state of the modulation scheme 500 is labeled "4B" where the voltage signal 510 is the intermediate positive value and the control signals SvR 522 and SwR 524 are low and the control signal SuR 520 is high, corresponding to switch 232, switch 234, and switch 238 being in an open state and to switch 230, switch 236, and switch 240 being in a closed state. During the time interval 552 the state of the modulation scheme 500 is labeled "1" where the voltage signal 510 is the peak positive value and the control signals SuR 520 and SwR 524 are high and the control signal SvR 522 is low, corresponding to switch 232, switch 234, and switch 240 being in an open state and to switch 230, switch 236, and switch 238 being in a closed state. During the time interval 554 the state of the modulation scheme 500 is labeled "4A" where the voltage signal 510 is an intermediate positive value and the control signals SuR 520 and SvR 522 are low and the control signal SwR 524 is high, corresponding to switch 230, switch 234, and switch 240 being in an open state and to switch 232, switch 236, and switch 238 being in a closed state. During the time interval 556 the modulation scheme 500 is in the state labeled "3A" where the voltage signal 510 is zero and the control signals SuR 520, SvR 522, and SwR 524 are all low, corresponding to switch 230, switch 234, and switch 238 being in an open state and to switch 232, switch 236, and switch 240 being in a closed state. During the time interval 558 the state of the modulation scheme 500 is labeled "5B" where the voltage signal 510 is the intermediate negative value and the control signals SvR 522 and SwR 524 are high and the control signal SuR 520 is low, corresponding to switch 230, switch 236, and switch 240 being in an open state and to switch 232, switch 234, and switch 238 being in a closed state. During the time interval 560 the state of the modulation scheme 500 is labeled "2" where the voltage signal 510 is a peak negative value and the control signals SuR 520 and SwR 524 are low and the control signal SvR 522 is high, corresponding to switch 230, switch 236, and switch 238 being in an open state and to switch 232, switch 234, and switch 240 being in a closed state. During the time interval 562 the state of the modulation scheme 500 is labeled "5A" where the voltage signal 510 is an intermediate negative value and the control signals SuR 520 and SvR 522 are high and the control signal SwR 524 is low, corresponding to switch 232, switch 236, and switch 238 being in an open state and to switch 230, switch 234, and switch 240 being in a closed state.

The modulation state labeled "4A" (e.g., as used in time interval 532 and time interval 554) and the modulation state labeled "4B" (e.g., as used in time interval 536 and time interval 550) both correspond to the same voltage level (in this example an intermediate positive voltage level), but they activate different switches in the system 200. Similarly, the modulation state labeled "5A" (e.g., as used in time interval 540 and time interval 562) and the modulation state labeled "5B" (e.g., as used in time interval 544 and time interval 558) both correspond to the same voltage level (in this example an intermediate negative voltage level), but they activate different switches in the system 200. Multiple modulation states for a given voltage level may be used to balance utilization of the components of the system 200 to reduce thermal stress on those components. For example, using a modulation scheme with multiple states for given voltage levels to balance component utilization may increase reliability and useful life of the system 200. A processing apparatus may be configured to invoke multiple states for a given voltage level (e.g., the state "3A" and the state "3B", the state "4A" and the state "4B", and/or the state "5A" and the state "5B") during a single period (e.g., the period between t=0 and t=T_s) of a multilevel voltage signal (e.g., the voltage signal 510) on the transformer. A processing apparatus (e.g., the processing apparatus 1510) may be configured to change a phase of these multiple states between periods of the multilevel voltage signal (e.g., the voltage signal 510) on the transformer 210. For example, in a first period between t=0 and t=T_s, the state "3A" of the modulation scheme 500 occurs in the time interval 530, before the state "3B" occurs during the time interval 538. During the next period between t=T_s and t=2*T_s, the phase of these states is changed such that the state "3A" of the modulation scheme 500 occurs in the time interval 556, after the state "3B" occurs during the time interval 548. For example, in a first period between t=0 and t=T_s, the state "4A" of the modulation scheme 500 occurs in the time interval 532, before the state "4B" occurs during the time interval 536. During the next period between t=T_s and t=2*T_s, the phase of these states is changed such that the state "4A" of the modulation scheme 500 occurs in the time interval 554, after the state "4B" occurs during the time interval 550. For example, in a first period between t=0 and t=T_s, the state "5A" of the modulation scheme 500 occurs in the time interval 540, before the state "5B" occurs during the time interval 544. During the next period between t=T_s and t=2*T_s, the phase of these states is changed such that the state "5A" of the modulation scheme 500 occurs in the time interval 562, after the state "5B" occurs during the time interval 558.

Figure 6:
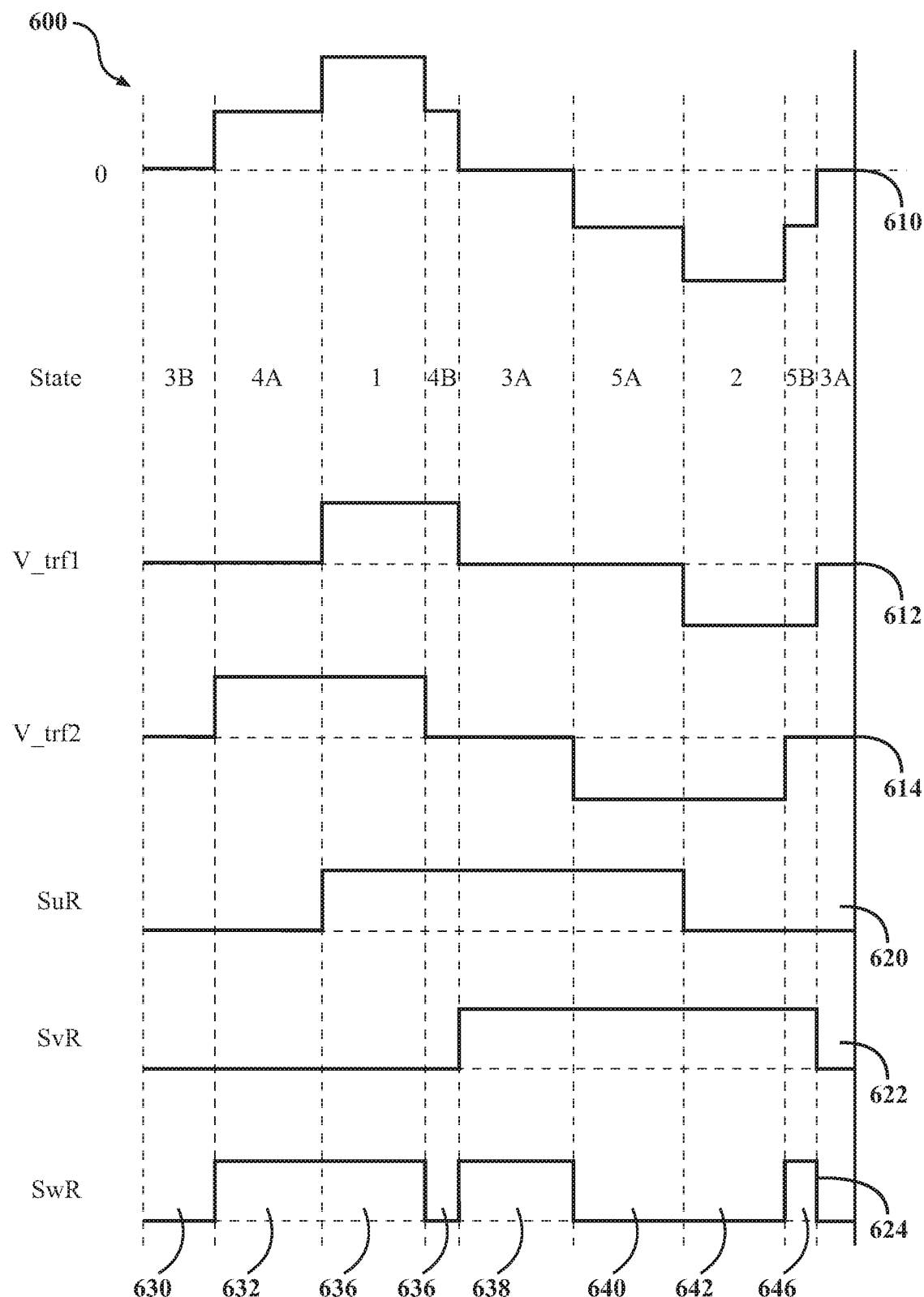
FIG. 6 is a plot of an example of a modulation scheme for switches of a five-level rectifier that compensates for unequal leakage inductance of windings of a transformer.

FIG. 6 is a plot of an example of a modulation scheme 600 for switches of a five-level rectifier that compensates for unequal leakage inductance of windings of a transformer. The modulation scheme 600 may be used to control the switches (230, 232, 234, 236, 238, and 240) of the system 200 to rectify voltage on the transformer 210. The plot of the modulation scheme 600 includes a plot of a voltage signal 610 across a primary winding of the transformer 210; a plot of the voltage 612 across the first secondary winding 220; a plot of the voltage 614 across the second secondary winding 222; a plot of SuR 620, which is a control signal (e.g., a gate voltage) that controls the switch 230 and the complement of which controls the switch 232; a plot of SvR 622, which is a control signal (e.g., a gate voltage) that controls the switch 234 and the complement of which controls the switch 236; and a plot of SwR 624, which is a control signal (e.g., a gate voltage) that controls the switch 238 and the complement of which controls the switch 240. The plot is divided horizontally into time intervals (630-646) corresponding to modulation states of the modulation scheme 600. The modulation scheme 600 may be implemented by a system including a processing apparatus (e.g., the system 1500, including the processing apparatus 1510, of FIG. 15) and the system 200. The processing apparatus may be configured to control the first switch 230, the second switch 232, the third switch 234, the fourth switch 236, the fifth switch 238, and the sixth switch 238 to rectify the multilevel voltage signal 610 on the transformer.

The modulation scheme 600 uses the same states as the modulation scheme 500 of FIG. 5, however durations of the states are changed to compensate for unequal leakage inductance of windings of the transformer 210. For example, a processing apparatus (e.g., the processing apparatus 1510) generating the control signals SuR 620, SvR 622, and SwR 624 may receive sensor readings measuring current and/or voltage through the windings of the transformer 210. Based on the sensor readings, the processing apparatus may adjust the durations of the modulation states to draw more current through one of the secondary windings (e.g., the second secondary winding 222) than is drawn through another secondary winding (e.g., the first secondary winding 220) of the transformer 210. In some implementations, the durations of the modulations states are updated in real-time during operation of the system 200 based on the sensor measurements. For example, a first duration of the first state (e.g., the state "4A") and a second duration of the second state (e.g., the state "4B") may be adjusted based on measurements of voltage and current on windings (e.g., the first secondary winding 220 and the second secondary winding 222) of the transformer 210, such that the first duration and the second duration are different. In the example depicted in FIG. 6, the duration of the time interval 632 for the state "4A" is made longer than the duration of the time interval 636 for the state "4B" and the duration of the time interval 640 for the state "5A" is made longer than the duration of the time interval 646 for the state "5B" so that more current will be drawn through the second secondary winding 222, which may have a lower leakage inductance. In some implementations, the first duration and the second duration are selected to balance leakage current between windings (e.g., the first secondary winding 220 and the second secondary winding 222) of the transformer. Adjusting the modulation state durations based on measurements of the operating parameters of windings of the transformer may increase the efficiency of a power converter including the system 200.

Figure 7:
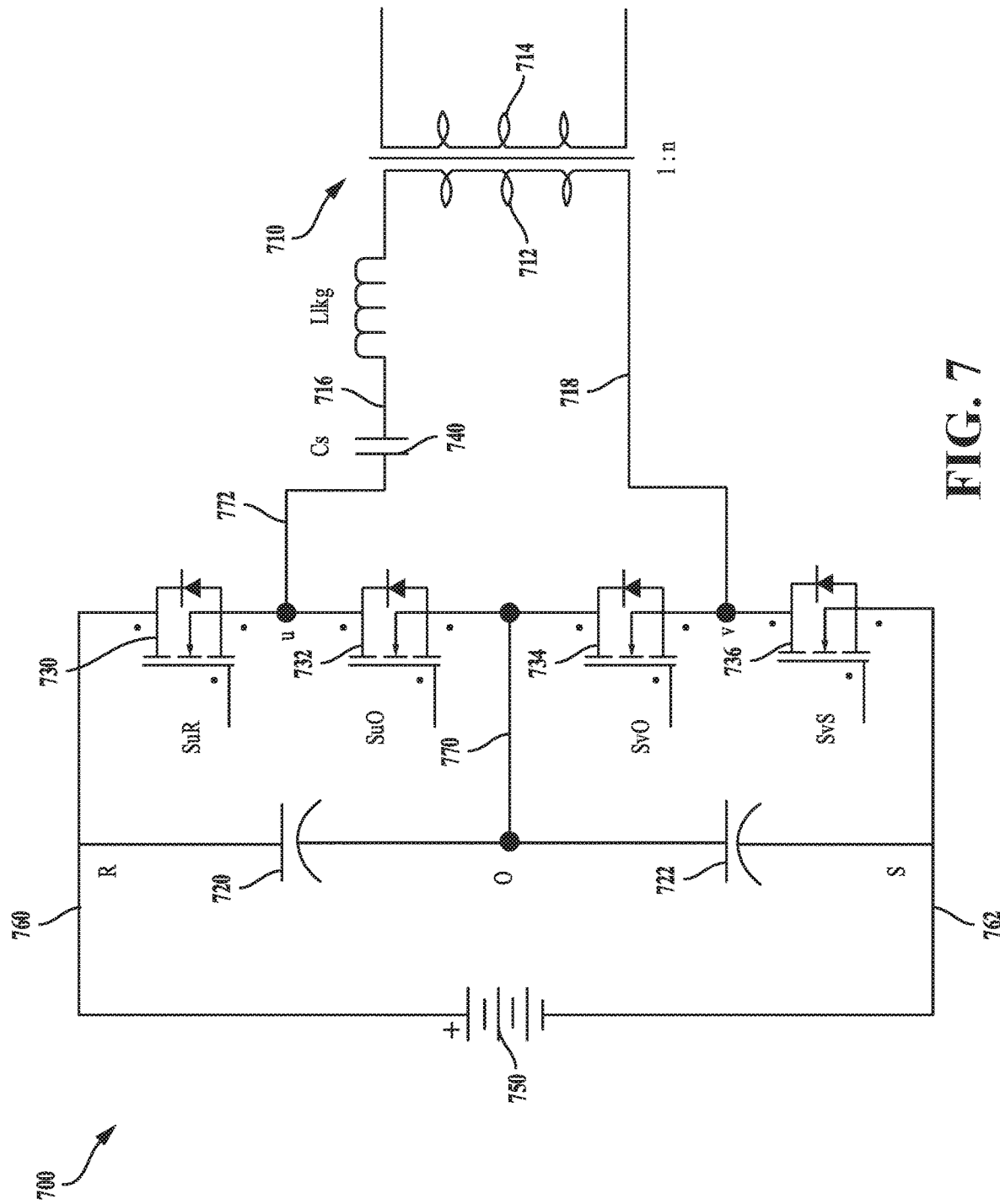
FIG. 7 is circuit diagram of an example of a system including a three-level inverter.

FIG. 7 is circuit diagram of an example of a system 700 including a three-level inverter. The three-level inverter may include a stacked half-bridge converter. The system 700 includes a transformer 710 including one or more primary windings 712 and one or more secondary windings 714. The system 700 includes an inverter connected to the primary winding via a fourth tap 716 and a fifth tap 718. The inverter of the system 700 includes a first capacitor 720 connecting a first terminal 760 of the inverter to a first node 770; a second capacitor 722 connecting the first node 770 to a second terminal 762 of the inverter; a seventh switch 730 connecting the first terminal 760 to a second node 772; an eighth switch 732 connecting the second node 772 to the first node 770; a ninth switch 734 connecting the first node 770 to the fifth tap 718; a tenth switch 736 connecting the fifth tap 718 to the second terminal 762 of the inverter; and a third capacitor 740 connecting the second node 772 to the fourth tap 716. The system 700 includes a DC power source 750 connected between the first terminal 760 and the second terminal 762. The DC power source 750 may include a battery (e.g., a 12 Volt, a 48 volt, a 400 volt, or an 800 volt battery). For example, the transformer 710 may be the transformer 300 of FIG. 3A or the transformer 350 of FIG. 3B. For example, the transformer may be the transformer 210 and the inverter may connect to the system 200 of FIG. 2. The third capacitor 740 may provide DC blocking and/or resonance functionality. For example, the system 700 may be implemented as part of the system 100 of FIG. 1A. For example, the system 700 may be implemented as part of the system 140 of FIG. 1B.

The inverter of the system 700 may provide a number of advantages over conventional half-bridge converters. For example, the individual devices may have a voltage rating half of the voltage rating used for a conventional half-bridge operating with the same DC power source 750, which may have a high voltage (e.g., 800 volts). For example, one half-bridge of a stacked half-bridge configuration can be shorted out to operate at a lower end of the range of battery voltages. For example, three-level voltage generation may be implemented by the inverter, which may enable: lower time derivative of the voltage across the transformer 710, reducing core losses; near sinusoidal currents, reducing copper losses; control flexibility to cover a wider input and/or output voltage fluctuations; and/or control flexibility for active voltage balancing of the two stacked capacitors (720 and 722).

Figure 8:
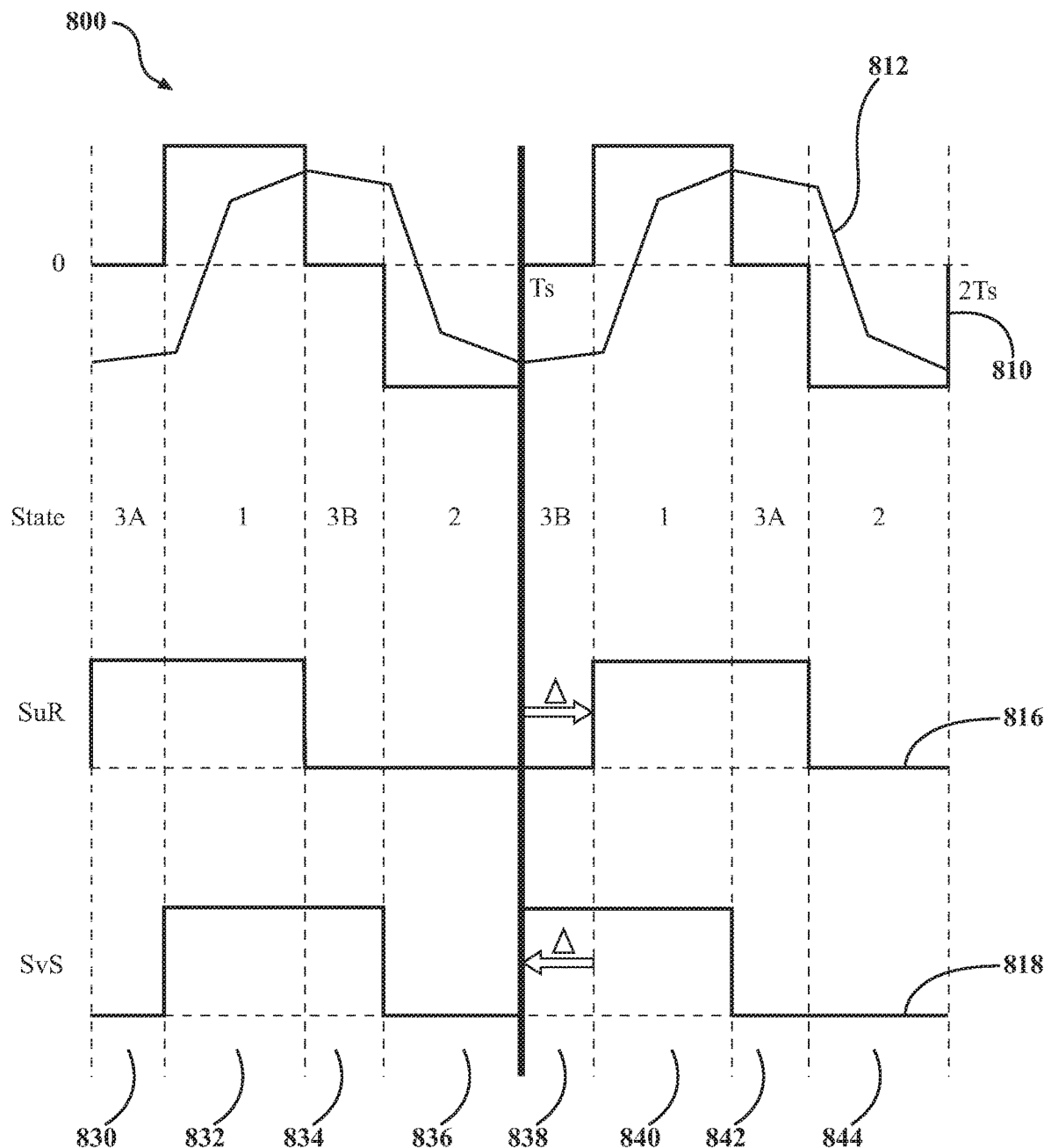
FIG. 8 is a plot of an example of a modulation scheme for switches of a three-level inverter with corresponding transformer voltage and current signals.

FIG. 8 is a plot of an example of a modulation scheme 800 for switches of a three-level inverter with corresponding transformer voltage and current signals. The modulation scheme 800 may be used to control the switches (730, 732, 734, and 736) of the system 700 to convert DC voltage from the DC power source 750 to AC voltage on the transformer 710. The plot of the modulation scheme 800 includes a plot of a voltage signal 810 across a primary winding 712 of the transformer 710; a plot of a current signal 812 through a primary winding 712 of the transformer 710; a plot of SuR 816, which is a control signal (e.g., a gate voltage) that controls the switch 730 and the complement of which controls the switch 732; and a plot of SvS 818, which is a control signal (e.g., a gate voltage) that controls the switch 734 and the complement of which controls the switch 736. The plot is divided horizontally into time intervals (830-844) corresponding to modulation states of the modulation scheme 800. The modulation scheme 800 may be implemented by a system including a processing apparatus (e.g., the system 1500, including the processing apparatus 1510, of FIG. 15) and the system 700. The processing apparatus may be configured to control the seventh switch 730, the eight switch 732, the ninth switch 734, and the tenth switch 736 to generate the multilevel voltage signal 810 on the transformer 710 from the direct current power source 750 connected between the first terminal 760 and the second terminal 762. For example, the processing apparatus may implement zero voltage switching or zero current switching as part of the modulation scheme 800.

The plot of the modulation scheme 800 covers two periods (t=0 to t=T_s and t=T_s to t=2*T_s) of the voltage signal 810 on the transformer. During the time interval 830 (starting at time t=0) the modulation scheme 800 is in a state labeled "3A" where the voltage signal 810 is zero and the control signal SuR 816 is high and the control signal SvS 818 is low, corresponding to switch 732 and switch 736 being in an open (e.g., non-conducting) state and to switch 730 and switch 734 being in a closed (e.g., conducting) state. During the time interval 832 the state of the modulation scheme 800 is labeled "1" where the voltage signal 810 is positive and the control signals SuR 816 and SvS 818 are high, corresponding to switch 732 and switch 734 being in an open state and to switch 730 and switch 736 being in a closed state. During the time interval 834 the state of the modulation scheme 800 is labeled "3B" where the voltage signal 810 is zero and the control signals SuR 816 is low and the control signal SvS 818 is high, corresponding to switch 730 and switch 734 being in an open state and to switch 732 and switch 736 being in a closed state. During the time interval 836 the state of the modulation scheme 800 is labeled "2" where the voltage signal 810 is negative and the control signals SuR 816 and SvS 818 are low, corresponding to switch 730 and switch 736 being in an open state and to switch 732 and switch 734 being in a closed state. During the time interval 838 the state of the modulation scheme 800 is labeled "3B" where the voltage signal 810 is zero and the control signals SuR 816 is low and the control signal SvS 818 is high, corresponding to switch 730 and switch 734 being in an open state and to switch 732 and switch 736 being in a closed state. During the time interval 840 the state of the modulation scheme 800 is labeled "1" where the voltage signal 810 is positive and the control signals SuR 816 and SvS 818 are high, corresponding to switch 732 and switch 734 being in an open state and to switch 730 and switch 736 being in a closed state. During the time interval 842 the modulation scheme 800 is in the state labeled "3A" where the voltage signal 810 is zero and the control signal SuR 816 is high and the control signal SvS 818 is low, corresponding to switch 732 and switch 736 being in an open state and to switch 730 and switch 734 being in a closed state. During the time interval 844 the state of the modulation scheme 800 is labeled "2" where the voltage signal 810 is negative and the control signals SuR 816 and SvS 818 are low, corresponding to switch 730 and switch 736 being in an open state and to switch 732 and switch 734 being in a closed state.

The modulation state labeled "3A" (e.g., as used in time interval 830 and time interval 842) and the modulation state labeled "3B" (e.g., as used in time interval 834 and time interval 838) both correspond to the same voltage level (in this example a voltage of zero), but they activate different switches in the system 700. Multiple modulation states for a given voltage level may be used to balance the charges on stacked capacitors (e.g., the first capacitor 720 and second capacitor 722). For example, using a modulation scheme with multiple states for given voltage levels to balance charges on stacked capacitors may reduce the voltage rating needed for those capacitors, which may enable a reduction in the size and/or cost of those capacitors. Multiple modulation states for a given voltage level may be used to balance utilization of the components of the system 700 to reduce thermal stress on those components. For example, using a modulation scheme with multiple states for given voltage levels to balance component utilization may increase reliability and useful life of the system 700. For example, the modulation 800 scheme may include, in a first state (e.g., the state "3A") corresponding to a first voltage level (e.g., zero), closing the seventh switch 730 and the ninth switch 734 and opening the eighth switch 732 and the tenth switch 736; and in a second state (e.g., the state "3B") corresponding to the first voltage level, opening the seventh switch 730 and the ninth switch 734 and closing the eighth switch 732 and the tenth switch 736. A processing apparatus may be configured to invoke both the first state (e.g., the state "3A" as shown in the time interval 830) and the second state (e.g., the state "3B" as shown in the time interval 834) during a single period (e.g., the period between t=0 and t=T_s) of a multi-level voltage signal (e.g., the voltage signal 810) on the transformer. A processing apparatus (e.g., the processing apparatus 1510) may be configured to change a phase of the first state (e.g., the state "3A") and the second state (e.g., the state "3B") between periods of the multilevel voltage signal (e.g., the voltage signal 810) on the transformer 710. For example, in a first period between t=0 and t=T_s, the state "3A" of the modulation scheme 800 occurs in the time interval 830, before the state "3B" occurs during the time interval 834. During the next period between t=T_s and t=2*T_s, the phase of these states is changed such that the state "3A" of the modulation scheme 800 occurs in the time interval 842, after the state "3B" occurs during the time interval 838.

In some implementations (not shown in FIG. 8), a modulation scheme may be used to control the switches (730, 732, 734, and 736) of the system 700 to convert DC voltage from the DC power source 750 to a two-level AC voltage on the transformer 710 while dynamically balancing the charges on the stacked capacitors (e.g., the capacitor 720 and the capacitor 722) by adjusting a phase between two modulation states. The modulation scheme may alternate between two modulation states: the modulation state labeled "1" (e.g., as shown in the time interval 832) and the modulation state labeled "2" (e.g., as shown in the time interval 836). To balance the capacitor voltages (i.e., the voltage on the capacitor 720 and the voltage on the capacitor 722) in upper half-bridge and lower half-bridge, the modulation scheme may adjust a small phase (e.g., 2% or 3% of the period of the voltage signal on the transformer) between the upper half-bridge pulses (e.g., pulses on the gate voltages for the switch 730 and the switch 732) and lower half-bridge pulses (e.g., pulses on the gate voltages for the switch 730 and the switch 732). A controller implementing this two-level modulation scheme may regulate the mid-point voltage to be close to zero by dynamically adjusting the phase between the two states.

In some implementations (not shown in FIG. 8), a modulation scheme may be used to control the switches (730, 732, 734, and 736) of the system 700 to convert DC voltage from the DC power source 750 to a two-level AC voltage on the transformer 710 during low battery conditions by shorting one of the stacked half-bridges by closing both switches in that half-bridge. For example, the bottom half-bridge may be shorted by closing the switch 734 and the switch 336, while the top half-bridge operates by alternating between a first modulation state, in which the switch 730 is closed and the switch 732 is open, and a second modulation state, in which the switch 732 is closed and the switch 733 is open. This may enable efficient power conversion with a battery that can have a large voltage range (e.g., 400 volts to 800 volts). When this modulation scheme is in use, one half-bridge may be operational at half the battery voltage. A motivation to implement this modulation scheme is to provide two devices in parallel for the return current through transformer. Since the current splits through two devices (e.g., the switch 734 and the switch 736), the conduction losses may be reduced. To transition from high voltage (e.g., 800V) to low voltage (e.g., 400V) operation, a stacked capacitor voltage balancing system regulates the voltage of one capacitor (e.g., the capacitor 720) to the low voltage level, while allowing the voltage across the other capacitor (e.g., the capacitor 722) to start reducing across the other until it drops to zero. That is when both the devices (e.g., the switch 734 and the switch 736) across that capacitor (e.g., the capacitor 722) are closed to reduce the losses.

Figure 9:
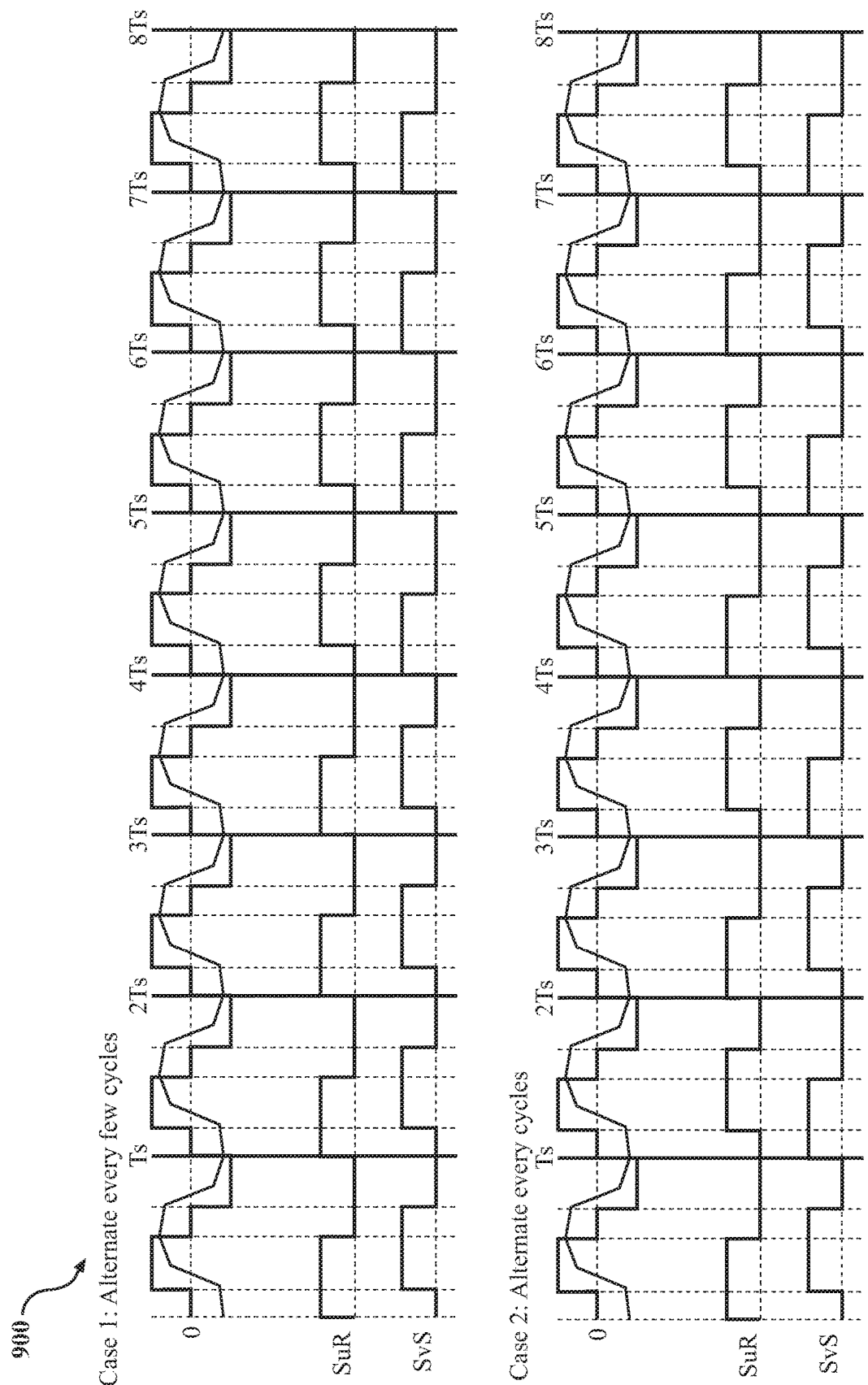
FIG. 9 is a plot of two examples of modulation schemes with different patterns of periodic phase changes for switches of a three-level inverter with corresponding transformer voltage and current signals.

FIG. 9 is a plot of two examples of modulation schemes (900 and 950) with different patterns of periodic phase changes for switches of a three-level inverter with corresponding transformer voltage and current signals. In the modulation scheme 900, the phase of the states "3A" and "3B" are kept the same for four successive periods of the multilevel voltage signal (e.g., the voltage signal 810) on the transformer 710 and the phase of the states "3A" and "3B" are changed after every fourth period of the multilevel voltage signal. In the modulation scheme 950, the phase of the states "3A" and "3B" are changed after every period of the multilevel voltage signal on the transformer 710.

FIG. 10A is a diagram of an example of logic 1000 used to generate a signal for controlling a switch of an inverter with phase changes. The logic 1000 takes a phase selection control signal 1002 (S), a switch control signal 1004 (SuR1) at a first phase, and a switch control signal 1006 (SuR2) at a second phase as input. The input signals (1002, 1004, and 1006) maybe binary control signals, as shown in FIGS. 10B and 10C. The logic 1000 includes a NOT operator 1010 that determines the logical complement of the phase selection control signal 1002; a first AND operator 1020, a second AND operator 1022, and an OR operator 1030. The logic 1000 outputs switch control signal 1040 (SuR) that may be used to control as switch in a modulation scheme (e.g., the modulation scheme 800) with phase that changes between periods of a multilevel voltage signal on a transformer. The logic 1000 uses the logical operators (1010, 1020, 1022, and 1030) to generate the switch control signal 1040 according to SuR=(S AND SuR1) OR ((NOT S) AND SuR2). The logical operators (1010, 1020, 1022, and 1030) may be implemented in hardware and/or in software. The phase selection control signal 1002 may be modified to change a phase of a modulation scheme between periods of a multi-level voltage signal on a transformer.

FIG. 10B is a plot 1060 of an example of signals of the switching phase control logic of FIG. 10A. In the example of plot 1060, the phase selection control signal 1002 (S) stays the same for multiple periods before and after changing at time 2*T_s. This results in a switch control signal 1040 (SuR) with a phase that is kept the same for four successive periods of the multilevel voltage signal (e.g., the voltage signal 810) on the transformer 710 and is changed after every few periods (e.g., 2 periods) of the multilevel voltage signal.

FIG. 10C is a plot 1080 of an example of signals of the switching phase control logic of FIG. 10A. In the example of plot 1080, the phase selection control signal 1002 (S) after every period of the multilevel voltage signal. This results in a switch control signal 1040 (SuR) with a phase that is changed after every period of the multilevel voltage signal on the transformer 710.

Figure 11:
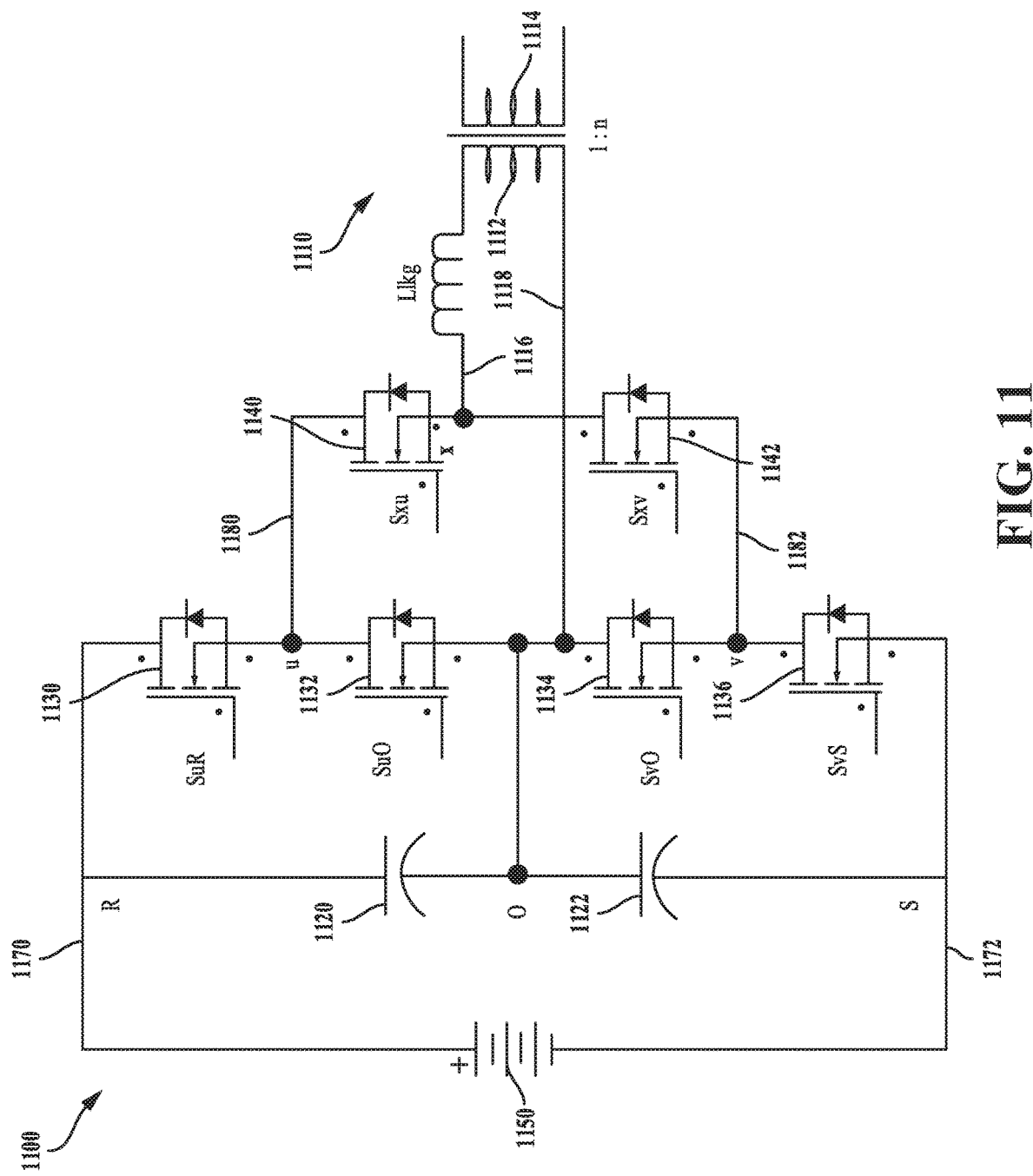
FIG. 11 is circuit diagram of an example of a system including a synchronous three-level inverter.

FIG. 11 is circuit diagram of an example of a system 1100 including a synchronous three-level inverter. The system 1100 includes a transformer 1110 including one or more primary windings 1112 and one or more secondary windings 1114. The system 1100 includes an inverter connected to the primary winding via a first tap 1116 and a second tap 1118. The inverter of the system 1100 includes a first capacitor 1120 connecting a first terminal 1170 of the inverter to the second tap 1118; a second capacitor 1122 connecting the second tap 1118 to a second terminal 1172 of the inverter; a first switch 1130 connecting the first terminal 1170 to a first node 1180; a second switch 1132 connecting the first node 1180 to the second tap 1118; a third switch 1134 connecting the second tap 1118 to a second node 1182; a fourth switch 1136 connecting the second node 1182 to the second terminal 1172 of the inverter; a fifth switch 1140 connecting the first node 1180 to the first tap 1116; and a sixth switch 1142 connecting the second node 1182 to the first tap 1116. For example, the system 1100 may be implemented as part of the system 100 of FIG. 1A. For example, the system 1100 may be implemented as part of the system 140 of FIG. 1B.

The system 1100 includes a DC power source 1150 connected between the first terminal 1170 and the second terminal 1172. The DC power source 1150 may include a battery (e.g., a 12 Volt, a 48 volt, a 400 volt, or an 800 volt battery). For example, the transformer 1110 may be the transformer 300 of FIG. 3A or the transformer 350 of FIG. 3B. For example, the transformer may be the transformer 210 and the inverter may connect to the system 200 of FIG. 2.

The system 1100 may include a transformer 1110 including a primary winding 1112, connecting a first tap 1116 and a second tap 1118. In some implementations, the primary winding 1112 may include multiple windings connected in series (e.g., where the transformer 1110 if the transformer 300 of FIG. 3).

The system 1100 includes a first capacitor 1120 connecting a first terminal 1170 to the second tap 1118 and a second capacitor 1122 connecting the second tap 1118 to a second terminal 1172. These stacked capacitors (1120 and 1122) may respectively have approximately half the voltage of the DC power source 1150 dropped across them. In some implementations a modulation scheme (e.g., the modulation scheme 1200 of FIG. 12) is used that balances the charge on the first capacitor 1120 and the second capacitor 1122. By keeping the voltages across the first capacitor 1120 and the second capacitor 1122 balanced and close to half the voltage of the DC power source 1150, capacitors with a lower voltage rating may be utilized, which may reduce the size and increase the power density of the system 1100.

The system 1100 includes a first switch 1130 connecting the first terminal 1170 to a first node 1180; an second switch 1132 connecting the first node 1180 to the second tap 1118; a third switch 1134 connecting the second tap 1118 to a second node 1182; a fourth switch 1136 connecting the second node 1182 to the second terminal 1172; an fifth switch 1140 connecting the first node 1180 to the first tap 1116; and a sixth switch 1142 connecting the second node 1182 to the first tap 1116. The DC power supply 1150 of the system 1100 may include a battery (e.g., a 400 volt battery or an 800 volt battery) connected between the first terminal 1170 and the second terminal 1172.

The inverter of the system 1100 may provide a number of advantages over conventional half-bridge converters. For example, the individual devices may have a voltage rating half of the voltage rating used for a conventional half-bridge operating with the same DC power source 1150, which may have a high voltage (e.g., 800 volts). For example, one half-bridge of a stacked half-bridge configuration can be shorted out to operate at a lower end of the range of battery voltages. For example, the fifth switch 1140 and the sixth switch 1142 may enable bipolar voltage generation without a blocking capacitor. For example, the system 1100 may enable easy modulation for voltage balancing of the split capacitors (e.g., the first capacitor 1120 and the second capacitor 1122). For example, the system 1100 may enable zero voltage level through two sets of parallel switches (e.g., the second switch 1132 and the fifth switch 1140 in parallel with the third switch 1134 and the sixth switch 1142 between the first tap 1116 and the second tap 1118, which may enable lower conduction losses by splitting the primary winding current through the two parallel paths. For example, three-level voltage generation may be implemented by the inverter, which may enable: lower time derivative of the voltage across the transformer 1110, reducing core losses; near sinusoidal currents, reducing copper losses; control flexibility to cover a wider input and/or output voltage fluctuations; and/or control flexibility for active voltage balancing of the two stacked capacitors (1120 and 1122).

Figure 12:
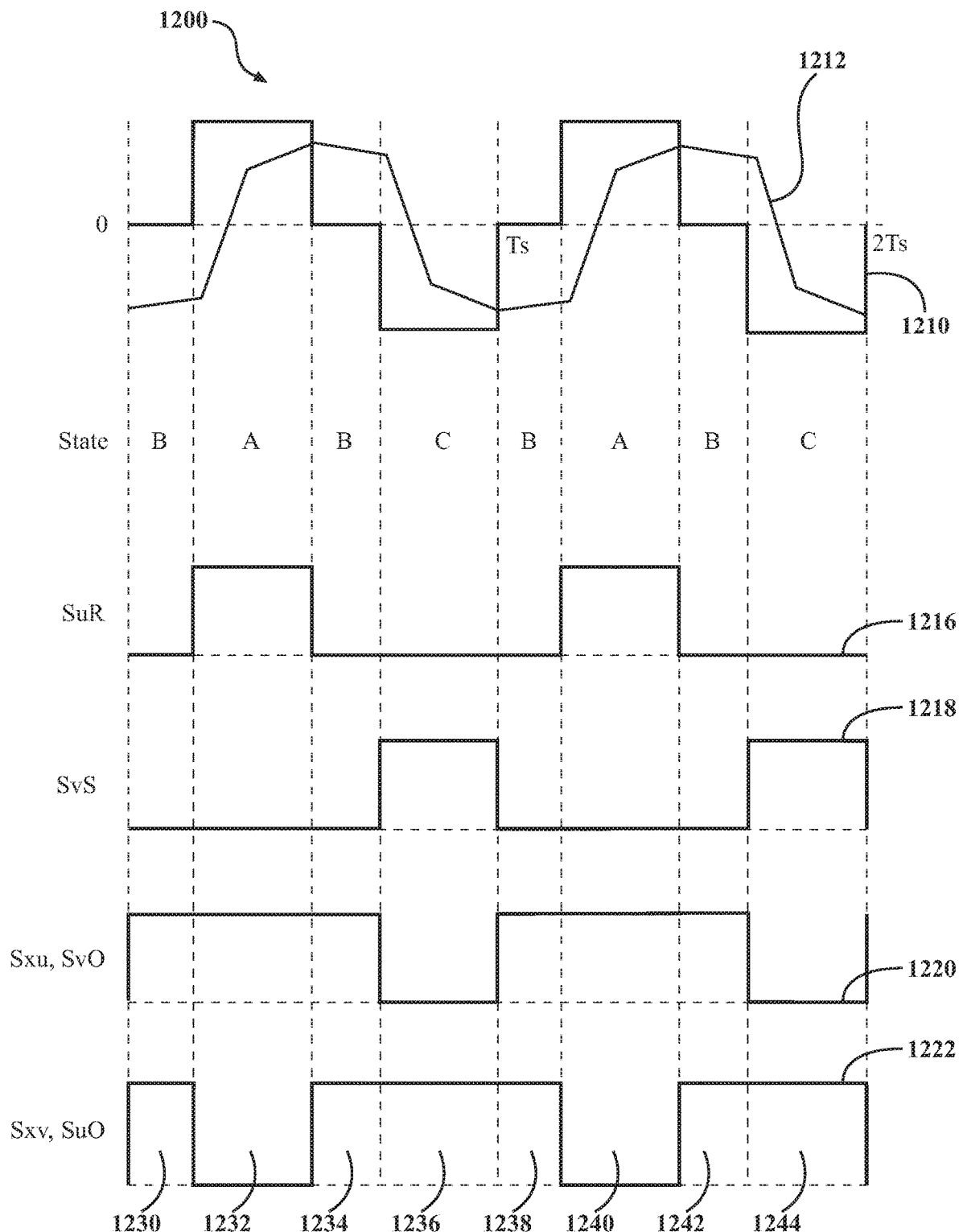
FIG. 12 is a plot of an example of a modulation scheme for switches of a synchronous three-level inverter with corresponding transformer voltage and current signals.

FIG. 12 is a plot of an example of a modulation scheme 1200 for switches of a synchronous three-level inverter with corresponding transformer voltage and current signals. The modulation scheme 1200 may be used to control the switches (1130, 1132, 1134, 1136, 1140, and 1142) of the system 1100 to convert DC voltage from the DC power source 1150 to AC voltage on the transformer 1110. The plot of the modulation scheme 1200 includes a plot of a voltage signal 1210 across a primary winding 1112 of the transformer 1110; a plot of a current signal 1212 through a primary winding 1112 of the transformer 1110; a plot of SuR 1216, which is a control signal (e.g., a gate voltage) that controls the switch 1130; a plot of SvS 1218, which is a control signal (e.g., a gate voltage) that controls the switch 1136; a plot of Sxu 1220, which is a control signal (e.g., a gate voltage) that controls the switch 1134 and the switch 1140; and a plot of Sxv 1222, which is a control signal (e.g., a gate voltage) that controls the switch 1132 and the switch 1142. The plot is divided horizontally into time intervals (1230-1244) corresponding to modulation states of the modulation scheme 1200. The modulation scheme 1200 may be implemented by a system including a processing apparatus (e.g., the system 1500, including the processing apparatus 1510, of FIG. 15) and the system 1100. The processing apparatus may be configured to control the first switch 1130, the second switch 1132, the third switch 1134, the fourth switch 1136, the fifth switch 1140, and the sixth switch 1142 to generate the multilevel voltage signal 1210 on the transformer 1110 from the direct current power source 1150 connected between the first terminal 1170 and the second terminal 1172. For example, the processing apparatus may implement zero voltage switching or zero current switching as part of the modulation scheme 1200.

The plot of the modulation scheme 1200 covers two periods (t=0 to t=T_s and t=T_s to t=2*T_s) of the voltage signal 1210 on the transformer. The voltage signal 1210 may transition between three voltage levels (e.g., V_dc/2, 0, and −V_dc/2, where V_dc is the voltage level of the DC power source 1150). During the time interval 1230 (starting at time t=0) the modulation scheme 1200 is in a state labeled "B" where the voltage signal 1210 is zero and the control signals SuR 1216 and SvS 1218 are low and the control signals Sxu 1220 and Sxv 1222 are high, corresponding to switch 1130 and switch 1136 being in an open (e.g., non-conducting) state and to switch 1132, switch 1134, switch 1140, and switch 1142 being in a closed (e.g., conducting) state. During the time interval 1232 the state of the modulation scheme 1200 is labeled "A" where the voltage signal 1210 is positive and the control signals SuR 1216 and Sxu 1220 are high and the control signals SvS 1218 and Sxv 1222 are low, corresponding to switch 1132, the switch 1136, and switch 1142 being in an open state and to switch 1130, switch 1134, and switch 1140 being in a closed state. During the time interval 1234 the state of the modulation scheme 1200 is labeled "B" where the voltage signal 1210 is zero and the control signals SuR 1216 and SvS 1218 are low and the control signals Sxu 1220 and Sxv 1222 are high, corresponding to switch 1130 and switch 1136 being in an open state and to switch 1132, switch 1134, switch 1140, and switch 1142 being in a closed state. During the time interval 1236 the state of the modulation scheme 1200 is labeled "C" where the voltage signal 1210 is negative and the control signals SuR 1216 and Sxu 1220 are low the control signals SvS 1218 and Sxv 1222 are high, corresponding to switch 1130, switch 1134, and switch 1140 being in an open state and to switch 1132, switch 1136, and switch 1142 being in a closed state. During the time interval 1238 the state of the modulation scheme 1200 is labeled "B" where the voltage signal 1210 is zero and the control signals SuR 1216 and SvS 1218 are low and the control signals Sxu 1220 and Sxv 1222 are high, corresponding to switch 1130 and switch 1136 being in an open state and to switch 1132, switch 1134, switch 1140, and switch 1142 being in a closed state. During the time interval 1240 the state of the modulation scheme 1200 is labeled "A" where the voltage signal 1210 is positive and the control signals SuR 1216 and Sxu 1220 are high and the control signals SvS 1218 and Sxv 1222 are low, corresponding to switch 1132, the switch 1136, and switch 1142 being in an open state and to switch 1130, switch 1134, and switch 1140 being in a closed state. During the time interval 1242 the modulation scheme 1200 is in the state labeled "B" where the voltage signal 1210 is zero and the control signals SuR 1216 and SvS 1218 are low and the control signals Sxu 1220 and Sxv 1222 are high, corresponding to switch 1130 and switch 1136 being in an open state and to switch 1132, switch 1134, switch 1140, and switch 1142 being in a closed state. During the time interval 1244 the state of the modulation scheme 1200 is labeled "C" where the voltage signal 1210 is negative and the control signals SuR 1216 and Sxu 1220 are low the control signals SvS 1218 and Sxv 1222 are high, corresponding to switch 1130, switch 1134, and switch 1140 being in an open state and to switch 1132, switch 1136, and switch 1142 being in a closed state.

A processing apparatus (e.g., the processing apparatus 1510) may be configured to, in a first state (e.g., the state labeled "B") corresponding to a first voltage level (e.g., zero), opening the first switch 1130 and the fourth switch 1136 and closing the second switch 1132, the third switch 1134, the fifth switch 11340, and the sixth switch 1142. In this first state, current through the primary winding 1112 of the transformer 1110 flows through two pairs of switches in parallel (i.e., the switch 1140 and the switch 1132 in parallel with the switch 1142 and the switch 1134). This parallel configuration splits the winding current between the switch components and may reduce the conduction losses in the system 1100. In some implementations, a processing apparatus is configured to, in a second state (e.g., the state labeled "A") corresponding to a second voltage level (e.g., positive V_dc/2), closing the first switch 1130, the third switch 1134, and the fifth switch 1140 and opening the second switch 1132, the fourth switch 1136, and the sixth switch 1142. Closing the third switch 1134 during the second state enables the discharge of parasitic capacitance and may facilitate zero voltage switching. In some implementations, a processing apparatus is configured to, in a third state (e.g., the state labeled "C") corresponding to a third voltage level (e.g., negative V_dc/2), opening the first switch 1130, the third switch 1134, and the fifth switch 1140 and closing the second switch 1132, the fourth switch 1136, and the sixth switch 1142. Closing the second switch 1132 during the third state enables the discharge of parasitic capacitance and may facilitate zero voltage switching.

Figure 13:
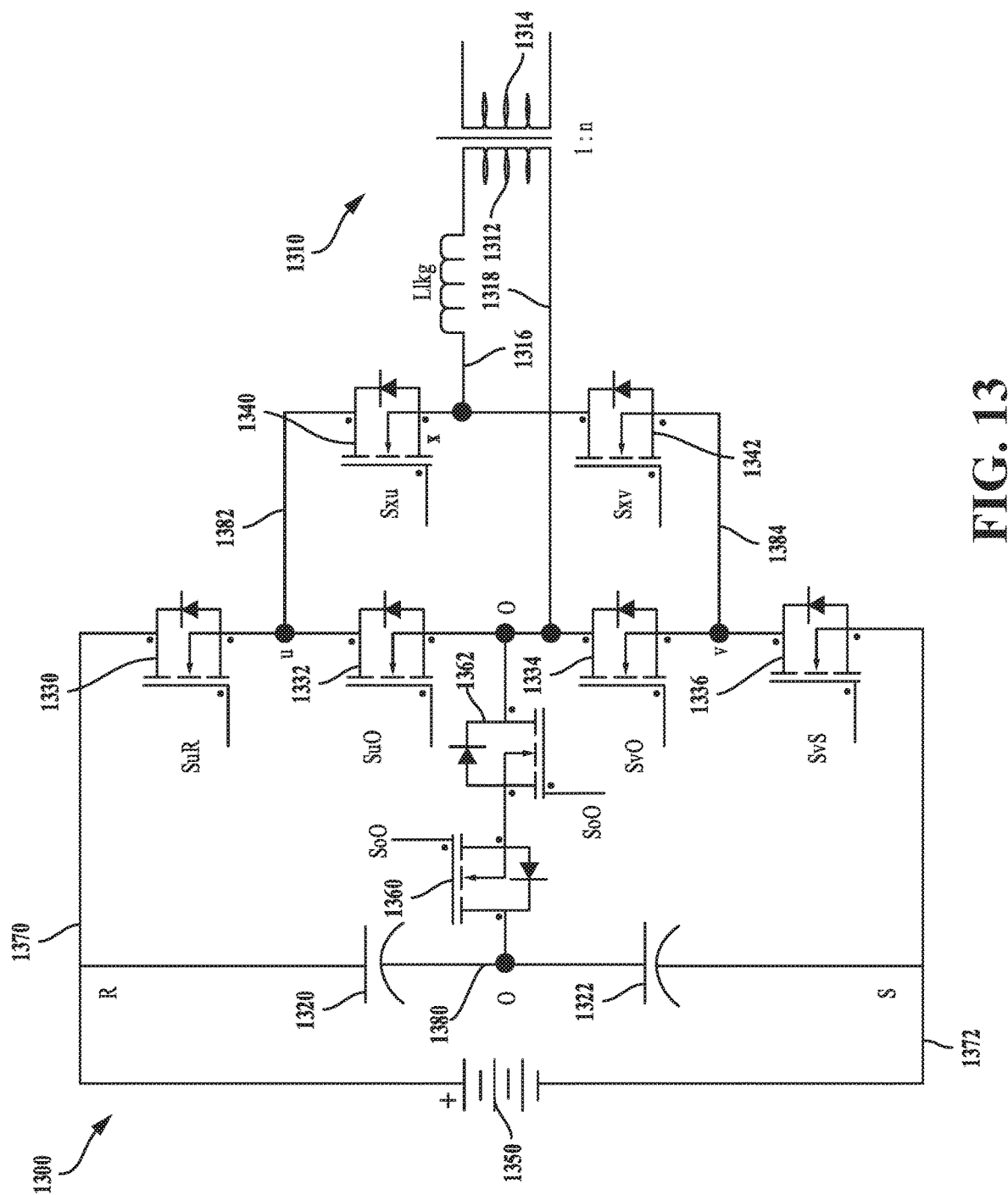
FIG. 13 is circuit diagram of an example of a system including a synchronous five-level inverter.

FIG. 13 is circuit diagram of an example of a system 1300 including a synchronous five-level inverter. The system 1300 includes a transformer 1310 including one or more primary windings 1312 and one or more secondary windings 1314. The system 1300 includes an inverter connected to the primary winding via a first tap 1316 and a second tap 1318. The inverter of the system 1300 includes a first capacitor 1320 connecting a first terminal 1370 of the inverter to a first node 1380; a second capacitor 1322 connecting the first node 1380 to a second terminal 1372 of the inverter; a first switch 1330 connecting the first terminal 1370 to a second node 1382; a second switch 1332 connecting the second node 1382 to the second tap 1318; a third switch 1334 connecting the second tap 1318 to a third node 1384; a fourth switch 1336 connecting the third node 1384 to the second terminal 1372 of the inverter; a fifth switch 1340 connecting the second node 1382 to the first tap 1316; a sixth switch 1342 connecting the third node 1384 to the first tap 1316; and a seventh switch 1360 and an eighth switch 1362 connected in series connecting the first node 1380 to the second tap 1318. The system 1300 includes a DC power source 1350 connected between the first terminal 1370 and the second terminal 1372. The DC power source 1350 may include a battery (e.g., a 14 Volt, a 48 volt, a 400 volt, or an 800 volt battery), which may be connected between the first terminal 1370 and the second terminal 1372. For example, the transformer 1310 may be the transformer 300 of FIG. 3A or the transformer 350 of FIG. 3B. For example, the transformer may be the transformer 210 and the inverter may connect to the system 200 of FIG. 2. For example, the system 1300 may be implemented as part of the system 100 of FIG. 1A. For example, the system 1300 may be implemented as part of the system 140 of FIG. 1B.

The system 1300 may include a transformer 1310 including a primary winding 1312, connecting a first tap 1316 and a second tap 1318. In some implementations, the primary winding 1312 may include multiple windings connected in series (e.g., where the transformer 1310 if the transformer 300 of FIG. 3).

The system 1300 includes a first capacitor 1320 connecting a first terminal 1370 to a first node 1380 and a second capacitor 1322 connecting the first node 1380 to a second terminal 1372. These stacked capacitors (1320 and 1322) may respectively have approximately half the voltage of the DC power source 1350 dropped across them. In some implementations a modulation scheme (e.g., the modulation scheme 1400 of FIG. 14) is used that balances the charge on the first capacitor 1320 and the second capacitor 1322. By keeping the voltages across the first capacitor 1320 and the second capacitor 1322 balanced and close to half the voltage of the DC power source 1350, capacitors with a lower voltage rating may be utilized, which may reduce the size and increase the power density of the system 1300.

The inverter of the system 1300 may provide a number of advantages over conventional half-bridge converters. For example, the individual devices may have a voltage rating that is half of the voltage rating used for a conventional half-bridge operating with the same DC power source 1350, which may have a high voltage (e.g., 800 volts). For example, one half-bridge of a stacked half-bridge configuration can be shorted out to operate at a lower end of the range of battery voltages. For example, the fifth switch 1340 and the sixth switch 1342 may enable bipolar voltage generation without a blocking capacitor. For example, the system 1300 may enable easy modulation for voltage balancing of the split capacitors (e.g., the first capacitor 1320 and the second capacitor 1322). For example, the system 1300 may enable zero voltage level through two sets of parallel switches (e.g., the second switch 1332 and the fifth switch 1340 in parallel with the third switch 1334 and the sixth switch 1342 between the first tap 1316 and the second tap 1318, which may enable lower conduction losses by splitting the primary winding current through the two parallel paths. For example, five-level voltage generation may be implemented by the inverter, which may enable: lower time derivative of the voltage across the transformer 1310, reducing core losses; near sinusoidal currents, reducing copper losses; control flexibility to cover a wider input and/or output voltage fluctuations; and/or control flexibility for active voltage balancing of the two stacked capacitors (1320 and 1322).

Figure 14:
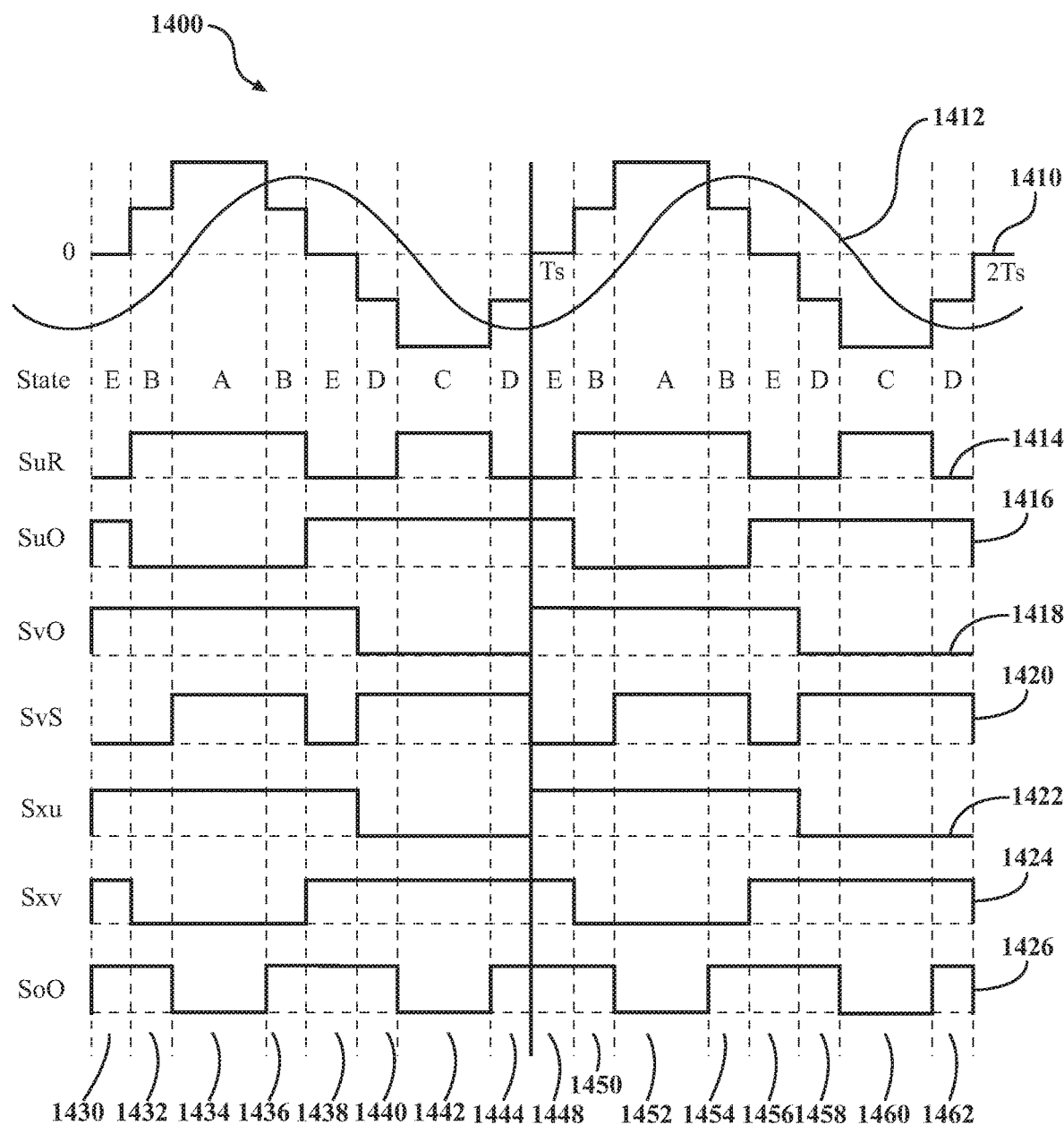
FIG. 14 is a plot of an example of a modulation scheme for switches of a synchronous five-level inverter with corresponding transformer voltage and current signals.

FIG. 14 is a plot of an example of a modulation scheme 1400 for switches of a synchronous five-level inverter with corresponding transformer voltage and current signals. The modulation scheme 1400 may be used to control the switches (1330, 1332, 1334, 1336, 1340, 1342, 1360, and 1362) of the system 1300 to convert DC voltage from the DC power source 1350 to AC voltage on the transformer 1310. The plot of the modulation scheme 1400 includes a plot of a voltage signal 1410 across a primary winding 1312 of the transformer 1310; a plot of a current signal 1412 through a primary winding 1312 of the transformer 1310; a plot of SuR 1414, which is a control signal (e.g., a gate voltage) that controls the switch 1330; a plot of SuO 1416, which is a control signal (e.g., a gate voltage) that controls the switch 1332; a plot of SvO 1418, which is a control signal (e.g., a gate voltage) that controls the switch 1334; a plot of SvS 1420, which is a control signal (e.g., a gate voltage) that controls the switch 1336; a plot of Sxu 1422, which is a control signal (e.g., a gate voltage) that controls the switch 1340; a plot of Sxv 1424, which is a control signal (e.g., a gate voltage) that controls the switch 1342; and a plot of SoO 1426, which is a control signal (e.g., a gate voltage) that controls the switch 1360 and the switch 1362. The plot is divided horizontally into time intervals (1430-1462) corresponding to modulation states of the modulation scheme 1400. The modulation scheme 1400 may be implemented by a system including a processing apparatus (e.g., the system 1500, including the processing apparatus 1510, of FIG. 15) and the system 1300. The processing apparatus may be configured to control the first switch 1330, the second switch 1332, the third switch 1334, the fourth switch 1336, the fifth switch 1340, the sixth switch 1342, the seventh switch 1360, and the eighth switch 1362 to generate the multilevel voltage signal 1410 on the transformer 1310 from the direct current power source 1350 connected between the first terminal 1370 and the second terminal 1372. For example, the processing apparatus may implement zero voltage switching or zero current switching as part of the modulation scheme 1400.

The plot of the modulation scheme 1400 covers two periods (t=0 to t=T_s and t=T_s to t=2*T_s) of the voltage signal 1410 on the transformer. The voltage signal 1410 may transition between five voltage levels (e.g., V_dc, V_dc/2, 0, −V_dc/2, and −V_dc where V_dc is the voltage level of the DC power source 1350). During the time interval 1430 (starting at time t=0) the modulation scheme 1400 is in a state labeled "E" where the voltage signal 1410 is zero and the control signals SuR 1414 and SvS 1420 are low and the control signals SuO 1416, SvO 1418, Sxu 1422, Sxv 1424, and SoO 1426 are high, corresponding to switch 1330 and switch 1336 being in an open (e.g., non-conducting) state and to switch 1332, switch 1334, switch 1340, switch 1342, switch 1360, and switch 1362 being in a closed (e.g., conducting) state. During the time interval 1432 the state of the modulation scheme 1400 is labeled "B" where the voltage signal 1410 is positive V_dc/2 and the control signals SuO 1416, SvS 1420, and Sxv 1424 are low and the control signals SuR 1414, SvO 1418, Sxu 1422, and SoO 1426 are high, corresponding to switch 1332, the switch 1336, and switch 1342 being in an open state and to switch 1330, switch 1334, switch 1340, switch 1360, and switch 1362 being in a closed state. During the time interval 1434 the state of the modulation scheme 1400 is labeled "A" where the voltage signal 1410 is positive V_dc and the control signals SuO 1416, Sxv 1424, and SoO 1426 are low and the control signals SuR 1414, SvO 1418, SvS 1420, and Sxu 1422 are high, corresponding to switch 1332, switch 1342, switch 1360, and switch 1362 being in an open state and to switch 1330, switch 1334, switch 1336, and switch 1340 being in a closed state. During the time interval 1436 the state of the modulation scheme 1400 is labeled "B" where the voltage signal 1410 is positive V_dc/2 and the control signals SuO 1416, SvS 1420, and Sxv 1424 are low and the control signals SuR 1414, SvO 1418, Sxu 1422, and SoO 1426 are high, corresponding to switch 1332, the switch 1336, and switch 1342 being in an open state and to switch 1330, switch 1334, switch 1340, switch 1360, and switch 1362 being in a closed state. During the time interval 1438 the state of the modulation scheme 1400 is labeled "E" where the voltage signal 1410 is zero and the control signals SuR 1414 and SvS 1420 are low and the control signals SuO 1416, SvO 1418, Sxu 1422, Sxv 1424, and SoO 1426 are high, corresponding to switch 1330 and switch 1336 being in an open (e.g., non-conducting) state and to switch 1332, switch 1334, switch 1340, switch 1342, switch 1360, and switch 1362 being in a closed (e.g., conducting) state. During the time interval 1440 the state of the modulation scheme 1400 is labeled "D" where the voltage signal 1410 is negative V_dc/2 and the control signals SuR 1414, SvO 1418, and Sxu 1422 are low and the control signals SuO 1416, SvS 1420, Sxv 1424, and SoO 1426 are high, corresponding to switch 1330, the switch 1334, and switch 1340 being in an open state and to switch 1332, switch 1336, switch 1342, switch 1360, and switch 1362 being in a closed state. During the time interval 1442 the modulation scheme 1400 is in the state labeled "C" where the voltage signal 1410 is negative V_dc and the control signals SvO 1418, Sxu 1422, and SoO 1426 are low and the control signals SuR 1414, SuO 1416, SvS 1420, and Sxv 1424 are high, corresponding to switch 1334, switch 1340, switch 1360, and switch 1362 being in an open state and to switch 1330, switch 1332, switch 1336, and switch 1342 being in a closed state. During the time interval 1444 the state of the modulation scheme 1400 is labeled "D" where the voltage signal 1410 is negative V_dc/2 and the control signals SuR 1414, SvO 1418, and Sxu 1422 are low and the control signals SuO 1416, SvS 1420, Sxv 1424, and SoO 1426 are high, corresponding to switch 1330, the switch 1334, and switch 1340 being in an open state and to switch 1332, switch 1336, switch 1342, switch 1360, and switch 1362 being in a closed state. The modulation scheme 1400 repeats in the next period between t=T_s and t=2*T_s taking on the states: "E" during time interval 1448, "B" during time interval 1450, "A" during time interval 1452, "B" during time interval 1454, "E" during time interval 1456, "D" during time interval 1458, "C" during time interval 1460, and "D" during time interval 1462.

A processing apparatus (e.g., the processing apparatus 1510) may be configured to, in a first state (e.g., the state labeled "E") corresponding to a first voltage level (e.g., zero), opening the first switch 1330 and the fourth switch 1336 and closing the second switch 1332, the third switch 1334, the fifth switch 13340, the sixth switch 1342, the seventh switch 1360, and the eighth switch 1362. In this first state, current through the primary winding 1312 of the transformer 1310 flows through two pairs of switches in parallel (i.e., the switch 1340 and the switch 1332 in parallel with the switch 1342 and the switch 1334). This parallel configuration splits the winding current between the switch components and may reduce the conduction losses in the system 1300. In some implementations, a processing apparatus is configured to, in a second state (e.g., the state labeled "B") corresponding to a second voltage level (e.g., positive V_dc/2), closing the first switch 1330, the third switch 1334, the fifth switch 1340, the seventh switch 1360, and the eighth switch 1362 and opening the second switch 1332, the fourth switch 1336, and the sixth switch 1342. Closing the third switch 1334 during the second state enables the discharge of parasitic capacitance and may facilitate zero voltage switching. In some implementations, a processing apparatus is configured to, in a third state (e.g., the state labeled "D") corresponding to a third voltage level (e.g., negative V_dc/2), opening the first switch 1330, the third switch 1334, and the fifth switch 1340 and closing the second switch 1332, the fourth switch 1336, the sixth switch 1342, the seventh switch 1360, and the eighth switch 1362. Closing the second switch 1332 during the third state enables the discharge of parasitic capacitance and may facilitate zero voltage switching. In some implementations, a processing apparatus is configured to, in a fourth state (e.g., the state labeled "A") corresponding to a fourth voltage level (e.g., positive V_dc), closing the first switch 1330, the third switch 1334, the fourth switch 1336, and the fifth switch 1340 and opening the second switch 1332, the sixth switch 1342, the seventh switch 1360, and the eighth switch 1362. In some implementations, a processing apparatus is configured to, in a fifth state (e.g., the state labeled "C") corresponding to a fifth voltage level (e.g., negative V_dc), closing the first switch 1330, the second switch 1332, the fourth switch 1336, and the sixth switch 1342 and opening the third switch 1334, the fifth switch 1340, the seventh switch 1360, and the eighth switch 1362.

Figure 15:
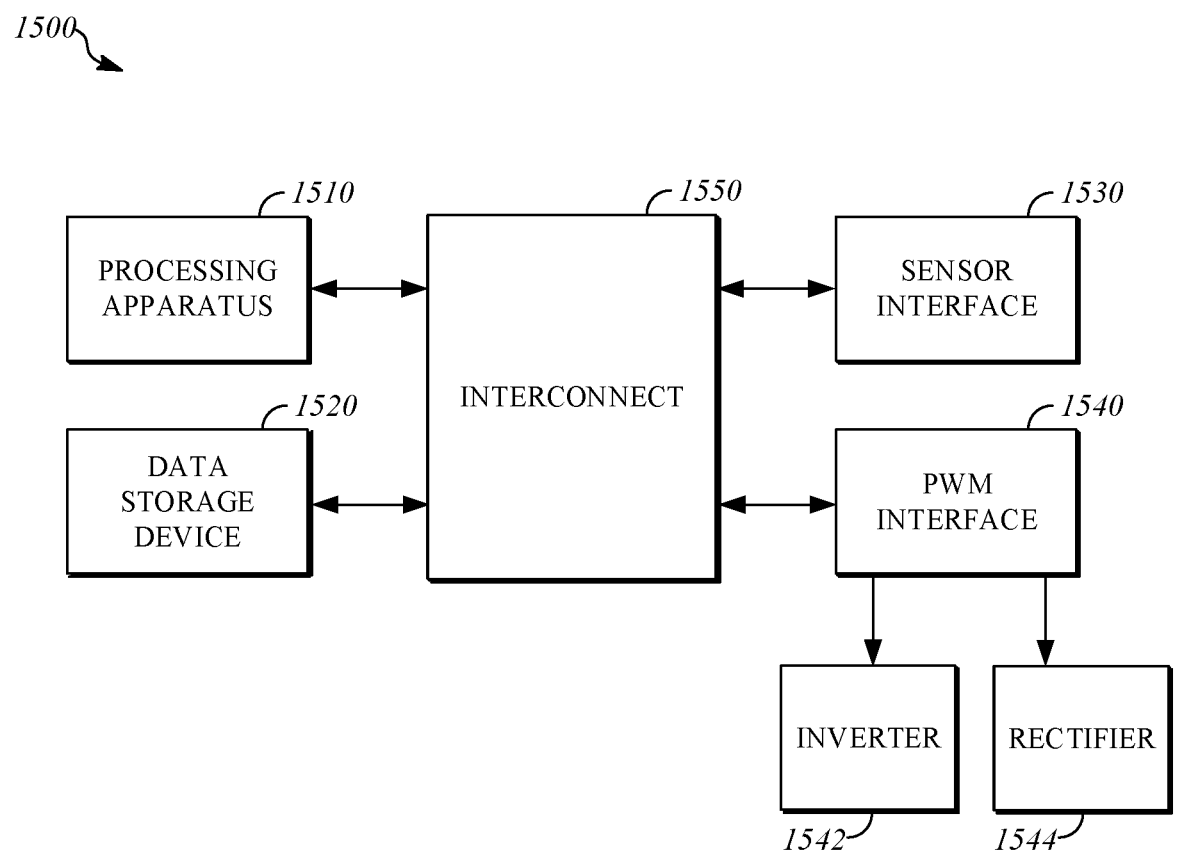
FIG. 15 is a block diagram of an example of a system for power conversion.

FIG. 15 is a block diagram of an example of a system 1500 for power conversion. The system 1500 may include a processing apparatus 1510, a data storage device 1520, a sensor interface 1530, a pulse width modulation interface 1540 to an inverter 1542 and a rectifier 1544, and an interconnect 1550 through which the processing apparatus 1510 may access the other components. The system 1500 may be configured to control a power converter (e.g., a DC/DC converter) including the inverter 1542 and/or the rectifier 1544. For example, the system 1500 may be configured to implement the process 1600 of FIG. 16. For example, the inverter 1542 may include the inverter of system 700 of FIG. 7. For example, the inverter 1542 may include the inverter of system 1100 of FIG. 11. For example, the inverter 1542 may include the inverter of system 1300 of FIG. 13. For example, the rectifier 1544 may include the rectifier of system 200 of FIG. 2.

The processing apparatus 1510 is operable to execute instructions that have been stored in a data storage device 1520. In some implementations, the processing apparatus 1510 is a processor with random access memory for temporarily storing instructions read from the data storage device 1520 while the instructions are being executed. The processing apparatus 1510 may include single or multiple processors each having single or multiple processing cores. Alternatively, the processing apparatus 1510 may include another type of device, or multiple devices, capable of manipulating or processing data. For example, the data storage device 1520 may be a non-volatile information storage device such as a hard drive, a solid-state drive, a read-only memory device (ROM), an optical disc, a magnetic disc, or any other suitable type of storage device such as a non-transitory computer readable memory. The data storage device 1520 may include another type of device, or multiple devices, capable of storing data for retrieval or processing by the processing apparatus 1510. For example, the data storage device 1520 can be distributed across multiple machines or devices such as network-based memory or memory in multiple machines performing operations that can be described herein as being performed using a single computing device for ease of explanation. The processing apparatus 1510 may access and manipulate data in stored in the data storage device 1520 via interconnect 1550. For example, the data storage device 1520 may store instructions executable by the processing apparatus 1510 that upon execution by the processing apparatus 1510 cause the processing apparatus 1510 to perform operations (e.g., operations that implement the process 1600 of FIG. 16).

The sensor interface 1530 may be configured to control and/or receive data (e.g., voltage and/or current measurements for one or more windings of a transformer that magnetically couples the inverter 1542 to the rectifier 1544) from one or more sensors (e.g., a voltmeter or an ammeter). In some implementations, the sensor interface 1530 may implement a serial port protocol (e.g., I2C or SPI) for communications with one or more sensor devices over conductors. In some implementations, the sensor interface 1530 may include a wireless interface for communicating with one or more sensor groups via low-power, short-range communications (e.g., using a local area network protocol).

The pulse width modulation interface 1540 allows input and output of information to other systems to facilitate automated control of those systems. For example, the pulse width modulation interface 1540 may include latches, crystal oscillators, clocking circuits, and other logic circuits (e.g., the logic 1000 of FIG. 10A) for generating control signals for switches in the inverter 1542 and the rectifier 1544. For example, the control signals may be binary pulse width modulated voltage signals. The pulse width modulation interface 1540 may generate control signals for switches in the inverter 1542 and the rectifier 1544 in response to one or more commands from the processing apparatus 1510. For example, the interconnect 1550 may be a system bus, or a wired or wireless network.

For example, the processing apparatus 1510 and/or the pulse width modulation interface 1540 may implement a pulse width modulation controller for a DC/DC power converter (e.g., the system 100 of FIG. 1A) including the inverter 1542 magnetically coupled to the rectifier 1544 via a transformer (e.g., the transformer 300 of FIG. 3A or the transformer 350 of FIG. 3B). The pulse width modulation controller may implement a modulation scheme (e.g., the modulation scheme 400, the modulation scheme 500, the modulation scheme 800, the modulation scheme 1200, and/or the modulation scheme 1400) and dynamically adjust control parameters of the modulation scheme. For example, the control parameters of the modulation scheme may include a duty cycle of the inverter 1542, a duty cycle of the rectifier 1544, a phase between control signaling for the inverter 1542 and control signaling for the rectifier 1544, and/or the switching frequency for the DC/DC power converter. The control parameters of the pulse width modulation controller may be adjusted based on operating parameters of the DC/DC power converter that are sensed (e.g., using sensors accessed via the sensor interface 1530). For example, the operating parameters may include an input DC voltage (e.g., voltage of the high voltage battery 102), an output DC voltage (e.g., voltage of the low voltage battery 104), and/or a current in DC/DC power converter (e.g., a current through a primary winding or a secondary winding of the transformer). For example, the pulse width modulation controller may implement a modulation scheme with zero voltage switching or zero current switching.

Figure 16:
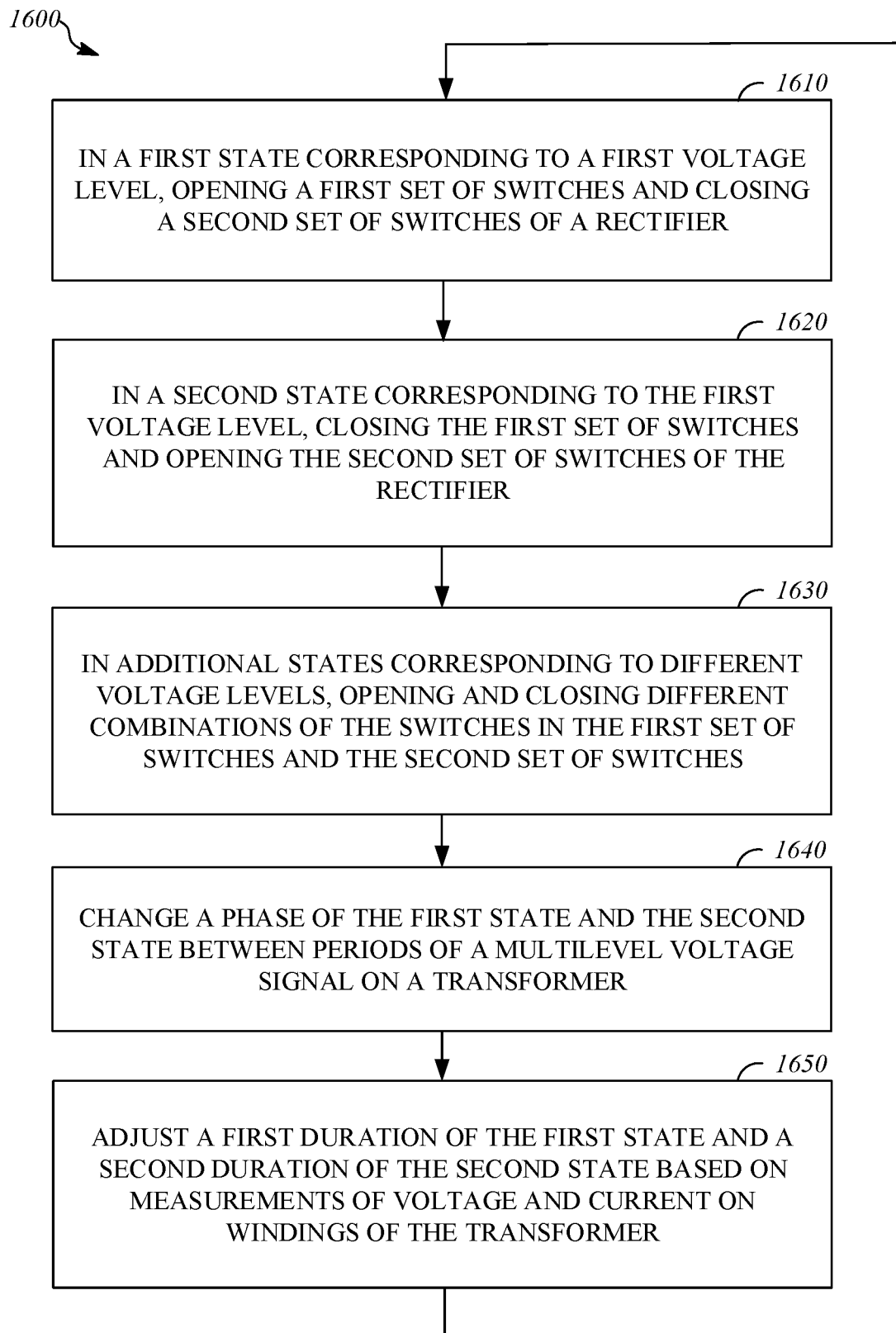
FIG. 16 is a flow chart of an example of a process for controlling switches of a rectifier for power conversion.

FIG. 16 is a flow chart of an example of a process 1600 for controlling switches of a rectifier for power conversion. The process 1600 includes (at operation 1610), in a first state corresponding to a first voltage level, opening a first set of switches and closing a second set of switches; (at operation 1620) in a second state corresponding to the first voltage level, the first set of switches and opening the second set of switches; (at operation 1630) in additional states corresponding to different voltage levels, opening and closing different combinations of switches in the first set of switches and the second set of switches; (at operation 1640) changing a phase of the first state and the second state between periods of a multilevel voltage signal on a transformer; and (at operation 1650) adjusting a first duration of the first state and a second duration of the second state based on measurements of voltage and current on windings of the transformer. For example, the process 1600 may be implemented by the system 1500 of FIG. 15. For example, the process 1600 may be implemented to control switches in a multilevel synchronous rectifier and/or to control switches in a multilevel inverter. For example, the process 1600 may be implemented using the system 200 of FIG. 2. For example, the process 1600 may be implemented using the system 700 of FIG. 7.

The process 1600 includes (at operation 1610), in a first state corresponding to a first voltage level, opening a first set of switches and closing a second set of switches. The process 1600 includes (at operation 1620), in a second state corresponding to the first voltage level, closing the first set of switches and opening the second set of switches. In some implementations, the switches in the first set of switches are paired with respective switches in the second set of switches to prevent shorting terminals of the multilevel synchronous rectifier. For example, the first state may be the state labeled "3A" and the second state may be the state labeled "3B" as described in relation to the modulation scheme 400 of FIG. 4. For example, the first state may be the state labeled "3A" and the second state may be the state labeled "3B" as described in relation to the modulation scheme 800 of FIG. 8. For example, the first state may be the state labeled "4A" and the second state may be the state labeled "4B" as described in relation to the modulation scheme 500 of FIG. 5. For example, the first state may be the state labeled "5A" and the second state may be the state labeled "5B" as described in relation to the modulation scheme 500 of FIG. 5. For example, the first voltage level that is common to the first state and the second state may be zero volts, positive V_dc/2, or negative V_dc/2. In some implementations, both the first state and the second state are entered during a single period of a multilevel voltage signal on a transformer. Implementing both the first state and the second state in a modulation scheme for a power converter may provide advantages. For example, the utilization of components in a converter (e.g., the system 200 of FIG. 2 or the system 700 of FIG. 7) may be balanced, which may reduce thermal stress on the components. For example, the charges on stacked capacitors (e.g., the capacitor 720 and the capacitor 722) may be balanced, which may reduce the voltage rating needed for these capacitors and reduce the size and increase the power density of the converter.

The process 1600 includes (at operation 1630), in additional states corresponding to different voltage levels, opening and closing different combinations of switches in the first set of switches and the second set of switches. For example, the additional states may include the state labeled "1" and the state labeled "2" in the modulation scheme 400 of FIG. 4. For example, the additional states may include the state labeled "1" and the state labeled "2" in the modulation scheme 800 of FIG. 8.

The process 1600 includes (at operation 1640) changing a phase of the first state and the second state. The phase of the first state and the second state may be changed (e.g., using the logic 1000 of FIG. 10A) between periods of the multilevel voltage signal on the transformer. For example, the phase of the states may be changed in each successive period, or the phase of the states may be kept the same for N periods and changed once every N periods (e.g., as described in relation to FIG. 9).

The process 1600 includes (at operation 1640) adjusting durations of the first state and the second state. In some implementations, a first duration of the first state and a second duration of the second state are adjusted based on measurements of voltage and current on windings of the transformer, such that the first duration and the second duration are different. The first duration and the second duration may be selected to balance leakage current between windings of the transformer. For example, the first duration and the second duration may be adjusted as described in relation to FIG. 6.

The process 1600 may be repeated for respective periods of a multilevel voltage signal on a transformer. The order of the operations (e.g., the operation 1610, the operation 1620, and the operation 1630) may be changed between periods (e.g., as described in relation to operation 1640).

A first implementation is a system that includes: a transformer including a first secondary winding, connecting a first tap and a second tap, and a second secondary winding, connecting a third tap and the second tap; a first switch connecting the first tap to a first terminal; a second switch connecting the first tap to a second terminal; a third switch connecting the second tap to the first terminal; a fourth switch connecting the second tap to the second terminal; a fifth switch connecting the third tap to the first terminal; a sixth switch connecting the third tap to the second terminal; an electrical load connected between the first terminal and the second terminal; and a vehicle including a propulsion system configured to rotate wheels of the vehicle, a high voltage battery configured to provide power to the propulsion system, an inverter connected between the high voltage battery and a primary winding of the transformer, and a low voltage battery that is included in the electrical load.

A second implementation is a system that includes: a transformer including a primary winding, connecting a first tap and a second tap; a first capacitor connecting a first terminal to the second tap; a second capacitor connecting the second tap to a second terminal; a first switch connecting the first terminal to a first node; an second switch connecting the first node to the second tap; a third switch connecting the second tap to a second node; a fourth switch connecting the second node to the second terminal; an fifth switch connecting the first node to the first tap; a sixth switch connecting the second node to the first tap; and a vehicle including a propulsion system configured to rotate wheels of the vehicle, a first battery configured to provide power to the propulsion system that is connected between the first terminal and the second terminal, a rectifier connected to one or more secondary windings of the transformer, and a second battery that has a lower voltage than the first battery and is connected between output terminals of the rectifier.

A third implementation is a system that includes: a transformer including a plurality of secondary windings; a first set of switches connecting respective taps of the plurality of secondary windings to a first terminal; a second set of switches connecting the respective taps of the plurality of secondary windings to a second terminal; an electrical load connected between the first terminal and the second terminal; and a vehicle including a propulsion system configured to rotate wheels of the vehicle, a high voltage battery configured to provide power to the propulsion system, an inverter connected between the high voltage battery and a primary winding of the transformer, and a low voltage battery that is included in the electrical load.

A fourth implementation is a system that includes: a transformer including a first secondary winding, connecting a first tap and a second tap, and a second secondary winding, connecting a third tap and the second tap; a first switch connecting the first tap to a first terminal; a second switch connecting the first tap to a second terminal; a third switch connecting the second tap to the first terminal; a fourth switch connecting the second tap to the second terminal; a fifth switch connecting the third tap to the first terminal; a sixth switch connecting the third tap to the second terminal; and an electrical load connected between the first terminal and the second terminal. The fourth implementation may include a processing apparatus that is configured to control the first switch, the second switch, the third switch, the fourth switch, the fifth switch, and the sixth switch to rectify a multilevel voltage signal on the transformer, including: in a first state corresponding to a first voltage level, opening the first switch, the third switch, and the fifth switch and closing the second switch, the fourth switch, and the sixth switch; and, in a second state corresponding to the first voltage level, closing the first switch, the third switch, and the fifth switch and opening the second switch, the fourth switch, and the sixth switch. In the fourth implementation, the processing apparatus may be configured to invoke both the first state and the second state during a single period of the multilevel voltage signal on the transformer. In the fourth implementation, the processing apparatus may be configured to change a phase of the first state and the second state between periods of the multilevel voltage signal on the transformer. In the fourth implementation, the first switch may be a field effect transistor. In the fourth implementation, the electrical load may include a battery. The fourth implementation may include a primary winding of the transformer and an inverter connected to the primary winding via a fourth tap and a fifth tap, the inverter comprising: a first capacitor connecting a third terminal to the fifth tap; a second capacitor connecting the fifth tap to a fourth terminal; a seventh switch connecting the third terminal to a first node; an eighth switch connecting the first node to the fifth tap; a ninth switch connecting the fifth tap to a second node; a tenth switch connecting the second node to the fourth terminal; an eleventh switch connecting the first node to the fourth tap; and a twelfth switch connecting the second node to the fourth tap. The fourth implementation may include a processing apparatus that is configured to control the seventh switch, the eighth switch, the ninth switch, the tenth switch, the eleventh switch, and the twelfth switch to generate a multilevel voltage signal on the transformer from a direct current power source connected between the third terminal and the fourth terminal, including: in a first state corresponding to a first voltage level, closing the seventh switch, the ninth switch, and the eleventh switch and opening the eighth switch, the tenth switch, and the twelfth switch; in a second state corresponding to a second voltage level, opening the seventh switch and the tenth switch and closing the eighth switch, the ninth switch, the eleventh switch, and the twelfth switch; and in a third state corresponding to a third voltage level, opening the seventh switch, the ninth switch, and the eleventh switch and closing the eighth switch, the tenth switch, and the twelfth switch. The fourth implementation may include a primary winding of the transformer and an inverter connected to the primary winding via a fourth tap and a fifth tap, the inverter comprising: a first capacitor connecting a third terminal to a first node; a second capacitor connecting the first node to a fourth terminal; a seventh switch connecting the third terminal to a second node; an eighth switch connecting the second node to the first node; a ninth switch connecting the first node to the fifth tap; a tenth switch connecting the fifth tap to the fourth terminal; and a third capacitor connecting the second node to the fourth tap. The fourth implementation may include a processing apparatus that is configured to control the seventh switch, the eighth switch, the ninth switch, and the tenth switch to generate a two-level voltage signal on the transformer from a direct current power source connected between the third terminal and the fourth terminal, including: dynamically balancing charges on the first capacitor and the second capacitor by adjusting a phase between two modulation states. The fourth implementation may include a processing apparatus that is configured to control the seventh switch, the eighth switch, the ninth switch, and the tenth switch to generate a two-level voltage signal on the transformer from a direct current power source connected between the third terminal and the fourth terminal, including: during low battery conditions, closing the ninth switch and the tenth switch; in a first state, closing the seventh switch and opening the eighth switch; and in a second state, opening the seventh switch and closing the eighth switch. The fourth implementation may include a processing apparatus that is configured to control the seventh switch, the eighth switch, the ninth switch, and the tenth switch to generate a multilevel voltage signal on the transformer from a direct current power source connected between the third terminal and the fourth terminal, including: in a first state corresponding to a first voltage level, closing the seventh switch and the ninth switch and opening the eighth switch and the tenth switch; and, in a second state corresponding to the first voltage level, opening the seventh switch and the ninth switch and closing the eighth switch and the tenth switch. In the fourth implementation, the processing apparatus may be configured to invoke both the first state and the second state during a single period of the multilevel voltage signal on the transformer. In the fourth implementation, the processing apparatus may be configured to change a phase of the first state and the second state between periods of the multilevel voltage signal on the transformer.

A fifth implementation is a system that includes: a transformer including a primary winding, connecting a first tap and a second tap; a first capacitor connecting a first terminal to the second tap; a second capacitor connecting the second tap to a second terminal; a first switch connecting the first terminal to a first node; an second switch connecting the first node to the second tap; a third switch connecting the second tap to a second node; a fourth switch connecting the second node to the second terminal; an fifth switch connecting the first node to the first tap; and a sixth switch connecting the second node to the first tap. The fifth implementation may include a battery connected between the first terminal and the second terminal. The fifth implementation may include a processing apparatus that is configured to control the first switch, the second switch, the third switch, the fourth switch, the fifth switch, and the sixth switch to generate a multilevel voltage signal on the transformer from a direct current power source connected between the first terminal and the second terminal, including: in a first state corresponding to a first voltage level, opening the first switch and the fourth switch and closing the second switch, the third switch, the fifth switch, and the sixth switch; in a second state corresponding to a second voltage level, closing the first switch, the third switch, and the fifth switch and opening the second switch, the fourth switch, and the sixth switch; and, in a third state corresponding to a third voltage level, opening the first switch, the third switch, and the fifth switch and closing the second switch, the fourth switch, and the sixth switch. The fifth implementation may include a processing apparatus that is configured to control the first switch, the second switch, the third switch, the fourth switch, the fifth switch, and the sixth switch to generate a multilevel voltage signal on the transformer from a direct current power source connected between the first terminal and the second terminal, including: in a first state corresponding to a first voltage level, opening the first switch and the fourth switch and closing the second switch, the third switch, the fifth switch, and the sixth switch.

A sixth implementation is a method for controlling switches in a multilevel synchronous rectifier that includes: in a first state corresponding to a first voltage level, opening a first set of switches and closing a second set of switches; and, in a second state corresponding to the first voltage level, closing the first set of switches and opening the second set of switches, wherein the switches in the first set of switches are paired with respective switches in the second set of switches to prevent shorting terminals of the multilevel synchronous rectifier. Both the first state and the second state may be entered during a single period of a multilevel voltage signal on a transformer. In the sixth implementation, a phase of the first state and the second state may be changed between periods of the multilevel voltage signal on the transformer. The sixth implementation may include adjusting a first duration of the first state and a second duration of the second state based on measurements of voltage and current on windings of the transformer, such that the first duration and the second duration are different. In the sixth implementation, the first duration and the second duration may be selected to balance leakage current between windings of the transformer. In the sixth implementation, the first voltage level may be zero volts.

A seventh implementation is a system that includes: a transformer including a plurality of secondary windings; a first set of switches connecting respective taps of the plurality of secondary windings to a first terminal; a second set of switches connecting the respective taps of the plurality of secondary windings to a second terminal; and an electrical load connected between the first terminal and the second terminal. In the seventh implementation, the plurality of secondary windings may consist of two secondary windings and the respective taps may consist of three taps and one of the three taps may connect to both of the two secondary windings. In the seventh implementation, the electrical load may include a battery.

An eighth implementation is a system that includes: a transformer including a primary winding, connecting a first tap and a second tap; a first capacitor connecting a first terminal to a first node; a second capacitor connecting the first node to a second terminal; a third capacitor connecting the first tap to a second node; a first switch connecting the first terminal to the second node; a second switch connecting the second node to the first node; a third switch connecting the first node to the second tap; a fourth switch connecting the second tap to the second terminal; and a processing apparatus that is configured to control the first switch, the second switch, the third switch, and the fourth switch to generate a multilevel voltage signal on the transformer from a direct current power source connected between the first terminal and the second terminal, including: in a first state corresponding to a first voltage level, closing the first switch and the third switch and opening the second switch and the fourth switch; and, in a second state corresponding to the first voltage level, opening the first switch and the third switch and closing the second switch and the fourth switch. In the eighth implementation, the processing apparatus may be configured to invoke both the first state and the second state during a single period of the multilevel voltage signal on the transformer. In the eighth implementation, the processing apparatus may be configured to change a phase of the first state and the second state between periods of the multilevel voltage signal on the transformer.

What is claimed is:

1. A synchronous rectifier configurable to generate a DC voltage from a multilevel voltage, the synchronous rectifier comprising:
   a plurality of switch pairs, each switch pair having a first switch configured to be coupled between a respective secondary winding tap of a transformer and a first output terminal of the synchronous rectifier and a second switch configured to be coupled between the respective secondary winding tap and a second output terminal of the synchronous rectifier, wherein the first and second switches of each switch pair are configured to be switched complementarily; and
   a processing apparatus coupled to the plurality of switch pairs and configured to operate the plurality of switch pairs according to a modulation scheme having a plurality of modulation states including at least two modulation states corresponding to a same voltage level of the multilevel voltage but activating different switches of the plurality of switch pairs.

2. The synchronous rectifier of claim 1 wherein the processing apparatus is configured to invoke each of the at least two modulation states during a single period of the multilevel voltage.

3. The synchronous rectifier of claim 2 wherein the processing apparatus is configured to change a phase of each of the at least two modulation states between periods of the multilevel voltage.

4. A power conversion system comprising:
   one or more transformer secondary windings having a plurality of taps; and
   a synchronous rectifier comprising:
      a plurality of switch pairs, each switch pair having a first switch configured to be coupled between a respective secondary winding tap of a transformer and a first output terminal of the synchronous rectifier and a second switch configured to be coupled between the respective secondary winding tap and a second output terminal of the synchronous rectifier, wherein the first and second switches of each switch pair are configured to be switched complementarily; and a processing apparatus coupled to the plurality of switch pairs and configured to operate the plurality of switch pairs according to a modulation scheme having a plurality of modulation states including at least two modulation states corresponding to a same voltage level of a multilevel voltage but activating different switches of the plurality of switch pairs.

5. The power conversion system of claim 4 wherein the processing apparatus is configured to invoke each of the at least two modulation states during a single period of the multilevel voltage.

6. The power conversion system of claim 5 wherein the processing apparatus is configured to change a phase of each of the at least two modulation states between periods of the multilevel voltage.

7. The power conversion system of claim 4 wherein the one or more transformer secondary windings comprise a first secondary winding and a second secondary winding coupled in series with reversed polarities and a first tap corresponds to a first terminal of the first secondary winding, a second tap corresponds to a common terminal of the one or more transformer secondary windings, and a third tap corresponds to a first terminal of the second secondary winding.

8. The power conversion system of claim 4 wherein the one or more transformer secondary windings are configured to be magnetically coupled to a single primary winding.

9. The power conversion system of claim 4 wherein the one or more transformer secondary windings are each configured to be magnetically coupled to respective primary windings.

10. The power conversion system of claim 4 further comprising a multilevel inverter electrically coupled to one or more primary windings magnetically coupled to the one or more transformer secondary windings.

11. The power conversion system of claim 10 wherein the multilevel inverter comprises a plurality of inverter switching devices in a stacked half bridge configuration.

12. The power conversion system of claim 11 wherein the inverter further comprises a first additional inverter switching device coupled between a junction of upper and lower inverter switching devices of an upper half bridge of the stacked half bridge and at least one of the one or more primary windings and a second additional inverter switching device coupled between a junction of upper and lower inverter switching devices of a lower half bridge of the stacked half bridge and at least one of the one or more primary windings.

13. The power conversion system of claim 12 wherein the processing apparatus is coupled to the first and second additional inverter switching devices and configured to operate the first and second additional inverter switching devices to facilitate one or more of: bipolar voltage generation without a blocking capacitor, conduction loss reduction and zero voltage switching.

14. The power conversion system of claim 11 wherein the multilevel inverter is a five-level inverter further comprising:

a first additional inverter switching device coupled between a junction of upper and lower inverter switching devices of an upper half bridge of the stacked half bridge and at least one of the one or more primary windings; and a second additional inverter switching device coupled between a junction of upper and lower inverter switching devices of a lower half bridge of the stacked half bridge and at least one of the one or more primary windings; and third and fourth additional inverter switching devices coupled back-to-back in series between a midpoint of a DC bus of the power conversion system and a junction of an upper half bridge and a lower half bridge of the stacked half bridge configuration.

15. The power conversion system of claim 11 wherein the processing apparatus is coupled to the plurality of inverter switching devices and configured to operate the plurality of inverter switching devices according to an inverter modulation scheme having a plurality of inverter modulation states including at least two inverter modulation states corresponding to a same voltage level of a multilevel inverter output voltage but activating different inverter switching devices of the plurality of inverter switching devices.

16. The power conversion system of claim 15 wherein the processing apparatus is configured to invoke each of the at least two inverter modulation states during a single period of the multilevel inverter output voltage.

17. The power conversion system of claim 16 wherein the processing apparatus is configured to alter a phase of the at least two inverter modulation states during subsequent periods of the multilevel inverter output voltage.

18. The power conversion system of claim 11 wherein:
the processing apparatus is coupled to the plurality of inverter switching devices and configured to operate the plurality of inverter switching devices according to an inverter modulation scheme having two inverter modulation states; and the processing apparatus is configured to regulate a midpoint voltage of the inverter by dynamically adjusting a phase between the two inverter modulation states.

19. The power conversion system of claim 11 wherein the processing apparatus is coupled to the plurality of inverter switching devices and configured to operate the plurality of inverter switching devices by shorting one of the stacked half-bridges responsive to a low input voltage condition.

20. A method of controlling a plurality of switching devices in a power conversion system according to a modulation scheme, the power conversion system having at least one of a multilevel synchronous rectifier and a multilevel inverter, the method comprising:

operating at least a first subset of the plurality of switching devices according to a modulation scheme having a plurality of modulation states including at least two modulation states activating different switching devices of the first subset of the plurality of switching devices to generate a same voltage level of a multilevel voltage; and alternating between the at least two modulation states, wherein alternating between the at least two modulation states comprises invoking each of the at least two modulation states during a single period of the multilevel voltage and changing a phase of each of the at least two modulation states between periods of the multilevel voltage.

21. The method of claim 20 wherein the first subset of the plurality of switching devices comprise the multilevel synchronous rectifier and the multilevel voltage is an input voltage into the multilevel synchronous rectifier.

22. The method of claim 20 wherein the first subset of the plurality of switching devices comprise the multilevel inverter and the multilevel voltage is an output voltage of the multilevel inverter.

23. The method of claim 22 wherein the multilevel inverter further comprises a second subset of the plurality of switching devices, the method further comprising operating the second subset of the plurality of switching devices to facilitate one or more of: bipolar voltage generation without a blocking capacitor, conduction loss reduction, and zero voltage switching.

24. The method of claim 22 wherein the multilevel inverter further comprises a third subset of the plurality of switching devices, the method further comprising regulating a mid-point voltage of the multilevel inverter by dynamically adjusting a phase between the at least two modulation states.

25. The method of claim 22 wherein the first subset of the plurality of switching devices are configured in a stacked half bridge configuration, the method further comprising operating the first subset of the plurality of switching devices by shorting one of the stacked half-bridges responsive to a low input voltage condition.

* * * * *